United States Patent
Terra et al.

(10) Patent No.: US 10,417,628 B2
(45) Date of Patent: Sep. 17, 2019

(54) MULTI-INTERFACE PROCESSING OF ELECTRONIC PAYMENT TRANSACTIONS

(71) Applicant: Square, Inc., San Francisco, CA (US)

(72) Inventors: David Terra, San Francisco, CA (US); Koun Han, San Francisco, CA (US); Michael Wells White, San Francisco, CA (US)

(73) Assignee: Square, Inc., San Francisco, CA (US)

(*) Notice: Subject to any disclaimer, the term of this patent is extended or adjusted under 35 U.S.C. 154(b) by 199 days.

(21) Appl. No.: 15/197,711

(22) Filed: Jun. 29, 2016

(65) Prior Publication Data
US 2018/0005226 A1 Jan. 4, 2018

(51) Int. Cl.
*G06Q 20/34* (2012.01)
*G06K 7/00* (2006.01)
(Continued)

(52) U.S. Cl.
CPC .......... *G06Q 20/341* (2013.01); *G06K 7/0004* (2013.01); *G06Q 20/202* (2013.01);
(Continued)

(58) Field of Classification Search
CPC .. G06Q 20/341; G06Q 20/202; G06Q 20/204; G06K 7/0004
USPC .......... 705/17, 18, 21, 38, 44; 235/383, 449; 706/46; 455/552.1; 709/227; 713/156, 713/168; 340/5.53
See application file for complete search history.

(56) References Cited

U.S. PATENT DOCUMENTS 5,696,955 A 12/1997 Goddard et al.
5,793,027 A 8/1998 Baik
(Continued)

FOREIGN PATENT DOCUMENTS

CA 2 997 776 A1 3/2017
CN 108140182 A 6/2018
(Continued)

OTHER PUBLICATIONS

Non-Final Office Action dated Nov. 16, 2016, for U.S. Appl. No. 15/197,708, of Terra, D., et al., filed Jun. 29, 2016.
(Continued)

*Primary Examiner* — Vanel Frenel
(74) *Attorney, Agent, or Firm* — Maynard Cooper & Gale, LLP; Chitra M. Kalyanaraman, Esq.

(57) ABSTRACT

A payment terminal may receive a request to process electronic payment information from a payment card in a swipe mode. The payment terminal may provide an opt-in request. If a user accepts, the payment terminal may receive a payment transaction request and electronic payment information of a swipe payment type from the payment card at a swipe interface. The payment terminal may determine whether the payment card is a chip card and generate a swipe mode processing indicator. The swipe mode indicator may allow processing of electronic payment information using procedures for the swipe payment type. The payment terminal may transmit the swipe mode processing indicator and electronic payment information to a payment server from a communication interface of the payment terminal, and may receive a payment approval response based on the swipe mode processing indicator.

31 Claims, 8 Drawing Sheets

(51) Int. Cl.
*G06Q 20/20* (2012.01)
*G07F 7/08* (2006.01)
*G07F 7/12* (2006.01)

(52) U.S. Cl.
CPC ......... *G06Q 20/204* (2013.01); *G06Q 20/347* (2013.01); *G07F 7/0886* (2013.01); *G07F 7/0893* (2013.01); *G07F 7/127* (2013.01)

(56) References Cited

U.S. PATENT DOCUMENTS

| | | | |
|---|---|---|---|
| 5,974,312 | A | 10/1999 | Hayes, Jr. et al. |
| 6,065,679 | A | 5/2000 | Levie et al. |
| 6,230,319 | B1 | 5/2001 | Britt, Jr. et al. |
| 6,332,172 | B1 | 12/2001 | Iverson |
| 6,609,655 | B1 | 8/2003 | Harrell |
| 6,675,203 | B1 | 1/2004 | Herrod et al. |
| 7,318,151 | B1 | 1/2008 | Harris |
| 7,403,907 | B1 | 7/2008 | Gerken, III et al. |
| 7,472,394 | B1 | 12/2008 | Meckenstock et al. |
| 7,478,065 | B1 | 1/2009 | Ritter et al. |
| 8,180,971 | B2 | 5/2012 | Scott et al. |
| 8,196,131 | B1 | 6/2012 | von Behren et al. |
| 8,245,076 | B2 | 8/2012 | Schindel, Jr. et al. |
| 8,284,061 | B1 | 10/2012 | Dione |
| 8,335,921 | B2 | 12/2012 | von Behren et al. |
| 8,336,762 | B1 | 12/2012 | DiMattina et al. |
| 8,534,555 | B1 | 9/2013 | Sweet et al. |
| 8,650,439 | B2 | 2/2014 | Rabeler |
| 8,910,868 | B1 | 12/2014 | Wade et al. |
| 8,959,034 | B2 | 2/2015 | Jiang et al. |
| 9,092,766 | B1 | 7/2015 | Bedier et al. |
| 9,134,994 | B2 | 9/2015 | Patel et al. |
| 9,330,383 | B1 | 5/2016 | Vadera |
| 9,342,823 | B2 | 5/2016 | Casares et al. |
| 9,357,332 | B2 | 5/2016 | Tang et al. |
| 9,547,861 | B2 * | 1/2017 | Itwaru ................ G06Q 20/4012 |
| 9,613,350 | B1 | 4/2017 | Vadera |
| 9,672,508 | B2 | 6/2017 | Aabye et al. |
| 9,778,928 | B1 | 10/2017 | Steshenko et al. |
| 9,785,930 | B1 | 10/2017 | Terra et al. |
| 9,836,732 | B1 | 12/2017 | Mocko et al. |
| 9,881,302 | B1 | 1/2018 | White et al. |
| 9,916,567 | B1 | 3/2018 | Baar et al. |
| 10,163,107 | B1 | 12/2018 | White et al. |
| 10,248,940 | B1 | 4/2019 | Bota et al. |
| 2003/0132293 | A1 | 7/2003 | Fitch et al. |
| 2004/0068656 | A1 | 4/2004 | Lu |
| 2004/0104268 | A1 | 6/2004 | Bailey |
| 2004/0138868 | A1 | 7/2004 | Kuznetsov et al. |
| 2004/0205745 | A1 | 10/2004 | Piazza |
| 2004/0230488 | A1 | 11/2004 | Beenau et al. |
| 2004/0236672 | A1 * | 11/2004 | Jung ...................... G06Q 20/10 705/38 |
| 2005/0091589 | A1 | 4/2005 | Ramarao |
| 2005/0156026 | A1 | 7/2005 | Ghosh et al. |
| 2005/0240919 | A1 | 10/2005 | Kim et al. |
| 2006/0059530 | A1 | 3/2006 | Spielman et al. |
| 2006/0093149 | A1 | 5/2006 | Zhu et al. |
| 2006/0219776 | A1 | 10/2006 | Finn |
| 2007/0044099 | A1 | 2/2007 | Rajput |
| 2007/0078957 | A1 | 4/2007 | Ypyä et al. |
| 2007/0168265 | A1 | 7/2007 | Rosenberger |
| 2007/0241185 | A1 | 10/2007 | Pang et al. |
| 2007/0257109 | A1 | 11/2007 | Johansen, Jr. et al. |
| 2008/0121687 | A1 | 5/2008 | Buhot |
| 2008/0162312 | A1 | 7/2008 | Sklovsky et al. |
| 2008/0162361 | A1 | 7/2008 | Sklovsky et al. |
| 2008/0179388 | A1 | 7/2008 | Pang et al. |
| 2008/0203170 | A1 | 8/2008 | Hammad et al. |
| 2008/0222193 | A1 | 9/2008 | Reid |
| 2009/0037284 | A1 | 2/2009 | Lewis et al. |
| 2009/0048953 | A1 | 2/2009 | Hazel et al. |
| 2009/0083474 | A1 | 3/2009 | Cooke |
| 2009/0217257 | A1 | 8/2009 | Huang et al. |
| 2009/0279549 | A1 | 11/2009 | Ramanathan et al. |
| 2010/0023777 | A1 | 1/2010 | Prevost et al. |
| 2010/0063893 | A1 * | 3/2010 | Townsend ............... G06Q 20/12 705/26.1 |
| 2010/0136913 | A1 | 6/2010 | Picquenot et al. |
| 2010/0159907 | A1 * | 6/2010 | Farley .................... G06Q 20/20 455/418 |
| 2010/0257067 | A1 | 10/2010 | Chan |
| 2010/0274712 | A1 | 10/2010 | Mestre et al. |
| 2010/0287083 | A1 | 11/2010 | Blythe |
| 2010/0312692 | A1 | 12/2010 | Teicher |
| 2011/0078081 | A1 | 3/2011 | Pirzadeh et al. |
| 2011/0110234 | A1 * | 5/2011 | Pulijala .............. G06Q 30/0267 370/235 |
| 2011/0119680 | A1 | 5/2011 | Li et al. |
| 2011/0155800 | A1 | 6/2011 | Mastrangelo et al. |
| 2011/0173691 | A1 | 7/2011 | Baba |
| 2011/0202415 | A1 | 8/2011 | Casares et al. |
| 2012/0011062 | A1 | 1/2012 | Baker et al. |
| 2012/0117568 | A1 | 5/2012 | Plotkin |
| 2012/0132712 | A1 | 5/2012 | Babu et al. |
| 2012/0135681 | A1 | 5/2012 | Adams et al. |
| 2012/0143703 | A1 | 6/2012 | Wall et al. |
| 2012/0166491 | A1 | 6/2012 | Angus et al. |
| 2012/0193434 | A1 | 8/2012 | Grigg et al. |
| 2012/0196531 | A1 | 8/2012 | Posch et al. |
| 2012/0198434 | A1 | 8/2012 | Dirstine et al. |
| 2012/0221466 | A1 | 8/2012 | Look |
| 2012/0278795 | A1 | 11/2012 | Bouchier et al. |
| 2013/0040566 | A1 | 2/2013 | Mourtel et al. |
| 2013/0125107 | A1 | 5/2013 | Bandakka et al. |
| 2013/0204721 | A1 * | 8/2013 | Gazdzinski ............ G06Q 10/08 705/17 |
| 2013/0211929 | A1 * | 8/2013 | Itwaru ................ G06Q 20/4012 705/16 |
| 2013/0254110 | A1 | 9/2013 | Royyuru et al. |
| 2013/0268443 | A1 * | 10/2013 | Petrov .................... G06Q 20/10 705/64 |
| 2013/0283256 | A1 | 10/2013 | Proud |
| 2013/0290234 | A1 * | 10/2013 | Harris .................... G06N 5/022 706/46 |
| 2013/0290945 | A1 | 10/2013 | Sawal et al. |
| 2013/0335199 | A1 | 12/2013 | Jonely |
| 2013/0346302 | A1 * | 12/2013 | Purves ................ G06Q 20/102 705/40 |
| 2014/0001263 | A1 | 1/2014 | Babu et al. |
| 2014/0081849 | A1 | 3/2014 | Varvarezis |
| 2014/0108704 | A1 | 4/2014 | Boring |
| 2014/0109076 | A1 | 4/2014 | Boone et al. |
| 2014/0136350 | A1 | 5/2014 | Savolainen |
| 2014/0138435 | A1 | 5/2014 | Khalid |
| 2014/0225713 | A1 | 8/2014 | McIntyre et al. |
| 2014/0256254 | A1 | 9/2014 | Sarda et al. |
| 2014/0263625 | A1 | 9/2014 | Smets et al. |
| 2014/0297530 | A1 * | 10/2014 | Eckel ................. G06Q 20/4014 705/44 |
| 2014/0317611 | A1 | 10/2014 | Wojcik et al. |
| 2014/0365776 | A1 | 12/2014 | Smets et al. |
| 2015/0039455 | A1 | 2/2015 | Luciani |
| 2015/0058145 | A1 * | 2/2015 | Luciani .............. G06Q 20/3274 705/17 |
| 2015/0161594 | A1 | 6/2015 | Jarman et al. |
| 2015/0178730 | A1 | 6/2015 | Gleeson et al. |
| 2015/0287031 | A1 | 10/2015 | Radu et al. |
| 2015/0348009 | A1 | 12/2015 | Brown et al. |
| 2015/0381203 | A1 | 12/2015 | Master et al. |
| 2016/0007292 | A1 | 1/2016 | Weng et al. |
| 2016/0117659 | A1 | 4/2016 | Bedier et al. |
| 2016/0183032 | A1 | 6/2016 | Pogorelik et al. |
| 2016/0188896 | A1 | 6/2016 | Zatko et al. |
| 2016/0188909 | A1 | 6/2016 | Zatko et al. |
| 2016/0217465 | A1 | 7/2016 | Gaur et al. |
| 2016/0226519 | A1 | 8/2016 | Meng et al. |
| 2017/0083879 | A1 | 3/2017 | Vadera |
| 2017/0200177 | A1 | 7/2017 | Psillas |
| 2017/0286093 | A1 | 10/2017 | Steshenko et al. |
| 2017/0308882 | A1 | 10/2017 | Bedier et al. |

(56) References Cited

U.S. PATENT DOCUMENTS

| | | | |
|---|---|---|---|
| 2018/0005223 A1 | 1/2018 | Terra et al. | |
| 2018/0005237 A1 | 1/2018 | Terra et al. | |
| 2018/0150815 A1 | 5/2018 | Mock et al. | |

FOREIGN PATENT DOCUMENTS

| | | |
|---|---|---|
| EP | 1 408 459 A1 | 4/2004 |
| GB | 2468774 A | 9/2010 |
| GB | 2519798 A | 5/2015 |
| KR | 2003-0086818 A | 11/2003 |
| WO | 2013/106723 A2 | 7/2013 |
| WO | 2013/126996 A1 | 9/2013 |
| WO | 2017/053699 A1 | 3/2017 |
| WO | 2017/172953 A1 | 10/2017 |
| WO | 2018/005475 A1 | 1/2018 |
| WO | 2018/005717 A1 | 1/2018 |

OTHER PUBLICATIONS

International Search Report and Written Opinion for International Application No. PCT/US2017/039858, dated Sep. 8, 2017.
Notice of Allowance dated Jun. 2, 2017, for U.S. Appl. No. 15/197,708, of Terra, D., et al., filed Jun. 29, 2016.
Notice of Allowance dated Nov. 9, 2018, for U.S. Appl. No. 14/863,675, of Bota, O.I., et al., filed Sep. 24, 2015.
Notice of Allowance dated Jan. 7, 2016, for U.S. Appl. No. 14/863,381, of Vadera, K., filed Sep. 23, 2015.
Non-Final Office Action dated Jul. 29, 2016, for U.S. Appl. No. 15/052,790, of Vadera, K., filed Feb. 24, 2016.
Notice of Allowance dated Nov. 23, 2016, for U.S. Appl. No. 15/052,790, of Vadera, K., filed Feb. 24, 2016.
Non-Final Office Action dated Jan. 31, 2017, for U.S. Appl. No. 15/197,706, of Terra, D., et al., filed Jun. 29, 2016.
Notice of Allowance dated May 18, 2017, for U.S. Appl. No. 15/086,024, of Steshenko, R., et al., filed Mar. 30, 2016.
Non-Final Office Action dated Jul. 19, 2017, for U.S. Appl. No. 15/086,025, of Steshenko, R., et al., filed Mar. 30, 2016.
Final Office Action dated Aug. 15, 2017, for U.S. Appl. No. 15/197,706, of Terra, D., et al., filed Jun. 29, 2016.
Advisory Action dated Nov. 30, 2017, for U.S. Appl. No. 15/197,706, of Terra, D. et al., filed Jun. 29, 2016.
Final Office Action dated Dec. 5, 2017, for U.S. Appl. No. 15/086,025, of Steshenko, R., et al., filed Mar. 30, 2016.
Non-Final Office Action dated May 16, 2018, for U.S. Appl. No. 14/863,675, of Bota, O.I., et al., filed Sep. 24, 2015.
Notice of Allowance dated May 23, 2018, for U.S. Appl. No. 15/052,792, of Vadera, K., filed Feb. 24, 2016.
Notice of Allowance dated Jun. 6, 2018, for U.S. Appl. No. 15/086,025, of Steshenko, R., et al., filed Mar. 30, 2016.
International Search Report and Written Opinion for International Application No. PCT/US2016/053303, dated Dec. 7, 2016.
International Search Report and Written Opinion for International Application No. PCT/US2017/024802, dated Jun. 7, 2017.
International Search Report and Written Opinion for International Application No. PCT/US2017/039480, dated Oct. 18, 2017.
Ogundele, O., et al., "The Implementation of a Full EMV Smartcard for a Point-of-sale Transaction and its Impact on the PCI DSS," IEEE computer society, 2012 ASE/IEEE International Conference on Social Computing and 2012 ASE/IEEE International Conference on Privacy, Security, Risk and Trust, pp. 797-806 (Year 2012).
Yang, M.H., "Security Enhanced EMV-Based Mobile payment protocol," Hindawi Publishing Corporation, The Scientific World Journal, vol. 2014, pp. 1-19 (Year 2014).
Examiner Requisition for Canadian Patent Application No. 2,997,776, dated Mar. 7, 2019.
Non-Final Office Action dated Mar. 18, 2019, for U.S. Appl. No. 15/197,707, of Terra, D., et al., filed Jun. 29, 2016.

\* cited by examiner

MULTI-INTERFACE PROCESSING OF ELECTRONIC PAYMENT TRANSACTIONS

BACKGROUND

Electronic payments may be performed in a variety of ways. A payment terminal may process payment transactions, and may interact with payment devices such as a payment card having a magnetic strip that is swiped in a magnetic reader of the payment terminal, a payment device having a Europay/Mastercard/Visa (EMV) chip that is inserted into a corresponding EMV slot of the payment terminal, and near field communication (NFC) enabled devices such as a smartphone or EMV card that is tapped at the payment terminal and transmits payment information over a secure wireless connection. The payment terminal may receive payment information from the payment device as well information about a transaction, and may communicate this information to a payment system for processing of the transaction.

At various times, conditions may occur that prevent the payment terminal from communicating with a payment server for completing a payment transaction. The conditions may be caused by a failure of a communication link between the payment terminal and payment server, such as a faulty network connection. At other times, a payment terminal may be unable to transmit information for approval by the payment server, such as when a connection between payment terminal and server experiences a high latency. In some instances, these conditions can lead to lengthy delays in payment processing times if payment processing cannot be completed until the payment terminal may transmit payment information to a server. Users of the payment terminal and consumers completing a payment transaction may lose patience if a delay is sufficiently lengthy. Delays during payment transactions may result in annoyance for customers seeking to complete transactions and reduced transaction volumes for merchants.

In addition, payment terminals experiencing a high payment transaction volume may experience significant delays, even when communication between a payment device and payment server, such as a server located at a financial institution, occurs quickly. Transaction durations may be affected by the amount of time a payment terminal requires to read electronic payment information from a payment device. Sometimes, a delay may occur based on a type of payment device used to complete a payment transaction. For example, some payment cards (e.g., a chip card) must remain physically inserted into a payment terminal while processing occurs. Delays in processing of payment card transactions may create particular discomfort or friction during payment transactions.

BRIEF DESCRIPTION OF THE DRAWINGS

The above and other features of the present disclosure, its nature and various advantages will be more apparent upon consideration of the following detailed description, taken in conjunction with the accompanying drawings in which.

DETAILED DESCRIPTION

Figure 1:
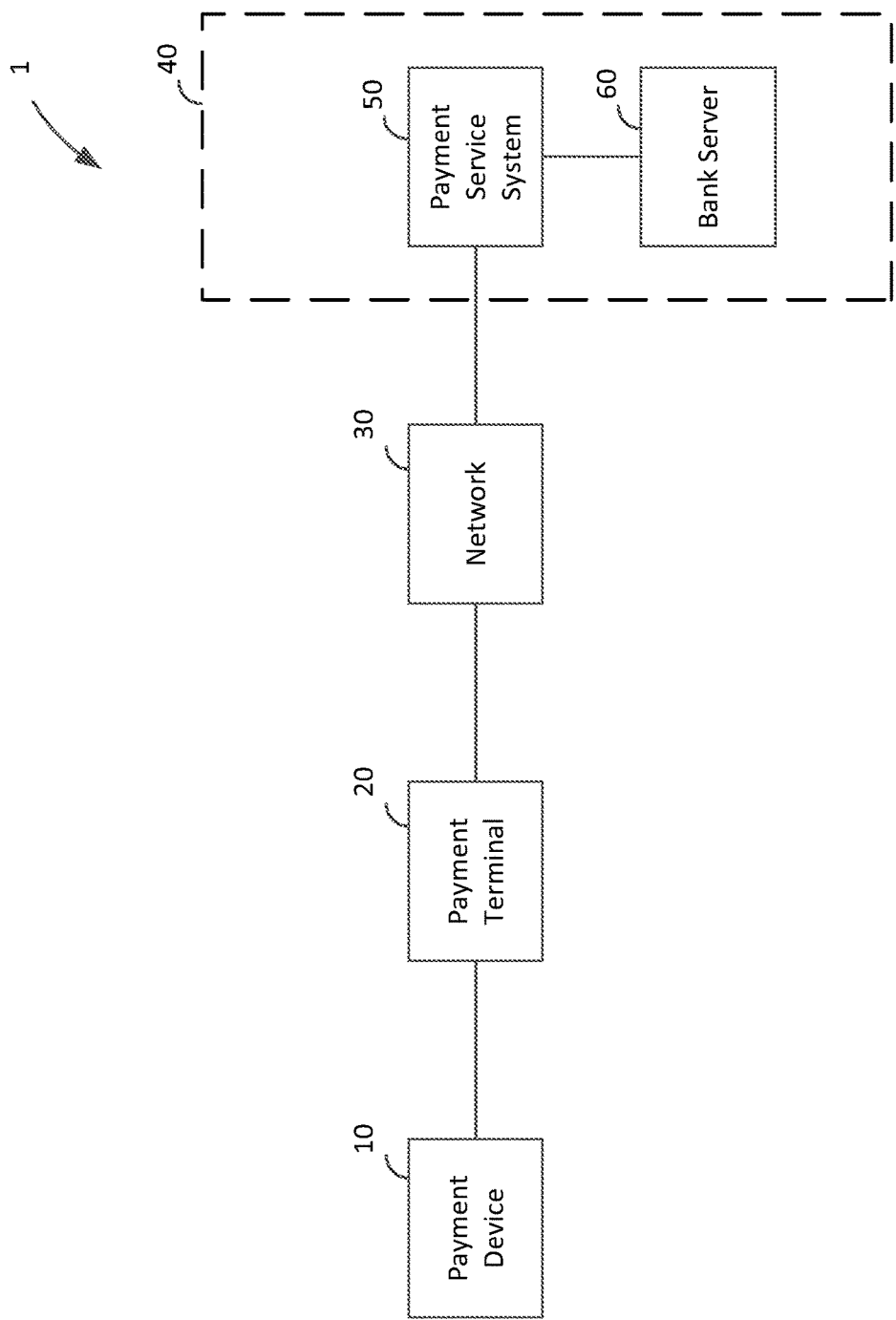
FIG. 1 shows an illustrative block diagram of a payment system in accordance with some embodiments of the present disclosure.

A payment system may include a payment terminal and a payment server. The payment terminal may have a payment reader and a merchant device. The payment reader receives payment information from a payment device such as an EMV chip card, a magnetic stripe card, or a NFC payment device. The merchant device has a point-of-sale application that provides a user interface for a merchant, and that communicates with the payment reader and payment server. The payment server processes transactions based on the payment information as well as other information (e.g., payment amount, merchant, location, etc.) received from the merchant device, and communicates a payment result (e.g., approval or denial) back to the merchant device.

The merchant device may receive a request at a user interface of the merchant device to process electronic payment information from a payment card in a swipe processing mode. In the swipe processing mode, a customer and merchant may physically execute the exchange of payment information faster, as a swipe does not require the payment card to be left in a payment terminal as is required for a chip card. Before entering swipe processing mode, the merchant device may provide an opt-in request to the user interface. In some embodiments, the opt-in request may include information for the user, such as notifications or disclosures regarding the ramifications (e.g., liability shift) of accepting the opt-in request.

If a user accepts the opt-in request, the merchant device may enter swipe mode and receive a payment transaction request from a merchant or customer. The payment terminal may receive electronic payment information of a swipe payment type from a magstripe of the payment card that the customer swipes through a swipe interface of the payment reader. The electronic payment information from the payment card may include any suitable information for providing approval of an electronic swipe payment transaction. In some embodiments, the payment terminal may determine whether the payment card is a chip card based on the electronic payment information. In some embodiments, the payment terminal may process the electronic payment transaction as a standard swipe payment transaction if the payment terminal determines that the payment card is not a chip card. If the payment terminal determines that the payment card is a chip card, it may generate and assign a swipe mode processing indicator and an indicator that the payment card is a chip card. In some embodiments, the swipe mode processing indicator may allow the electronic payment information to be processed according to the procedures for the swipe payment type (e.g., similar to a merchant who must process chip cards with a swipe interface because the merchant's payment terminal lacks a chip card interface). In some embodiments, the swipe mode processing indicator may indicate that the transaction is not a technical fallback transaction (e.g., such that a liability shift to the merchant may occur).

FIG. 1 depicts an illustrative block diagram of a payment system 1 in accordance with some embodiments of the present disclosure. In one embodiment, payment system 1 includes a payment device 10, payment terminal 20, network 30, and payment server 40. In an exemplary embodiment, payment server 40 may include a plurality of servers operated by different entities, such as a payment service system 50 and a bank server 60. These components of payment system 1 facilitate electronic payment transactions between a merchant and a customer.

The electronic interactions between the merchant and the customer take place between the customer's payment device 10 and the merchant's payment terminal 20. The customer has a payment device 10 such as a credit card having magnetic stripe, a credit card having an EMV chip, or a NFC-enabled electronic device such as a smart phone running a payment application. The merchant has a payment terminal 20 such as a payment terminal or other electronic device that is capable of processing payment information (e.g., encrypted payment card data and user authentication data) and transaction information (e.g., purchase amount and point-of-purchase information), such as a smart phone or tablet running a payment application.

In some embodiments (e.g., for low-value transactions or for payment transactions that are less than a payment limit indicated by a NFC or EMV payment device 10) the initial processing and approval of the payment transaction may be processed at payment terminal 20. In other embodiments, payment terminal 20 may communicate with payment server 40 over network 30. Although payment server 40 may be operated by a single entity, in one embodiment payment server 40 may include any suitable number of servers operated by any suitable entities, such as a payment service system 50 and one or more banks of the merchant and customer (e.g., a bank server 60). The payment terminal 20 and the payment server 40 communicate payment and transaction information to determine whether the transaction is authorized. For example, payment terminal 20 may provide encrypted payment data, user authentication data, purchase amount information, and point-of-purchase information to payment server 40 over network 30. Payment server 40 may determine whether the transaction is authorized based on this received information as well as information relating to customer or merchant accounts, and responds to payment terminal 20 over network 30 to indicate whether or not the payment transaction is authorized. Payment server 40 may also transmit additional information such as transaction identifiers to payment terminal 20.

Based on the information that is received at payment terminal 20 from payment server 40, the merchant may indicate to the customer whether the transaction has been approved. In some embodiments such as a chip card payment device, approval may be indicated at the payment terminal, for example, at a screen of a payment terminal. In other embodiments such as a smart phone or watch operating as a NFC payment device, information about the approved transaction and additional information (e.g., receipts, special offers, coupons, or loyalty program information) may be provided to the NFC payment device for display at a screen of the smart phone or watch or storage in memory.

In some embodiments, the payment server 40 may receive a plurality of payment approval requests from the payment terminal 20. Each payment approval request may comprise an electronic payment response and an associated payment type-indicator that indicates the payment response should be processed using an expedited processing mode, as discussed in greater detail hereafter. Payment server 40 also may receive payment approval requests from a payment terminal 20 comprising an indicator for checking an ability of a communication interface of the payment terminal 20 to communicate with the payment server 40, or a connection speed between the payment terminal 20 and payment server 40. In some embodiments, payment server 40 may receive a payment approval request and an associated time indicator, and process the payment approval request according to a time indicated by the time indicator. Further, in some embodiments, payment server 40 may receive electronic payment information and a swipe mode processing indicator, and provide a payment approval response for the electronic payment information.

Figure 2:
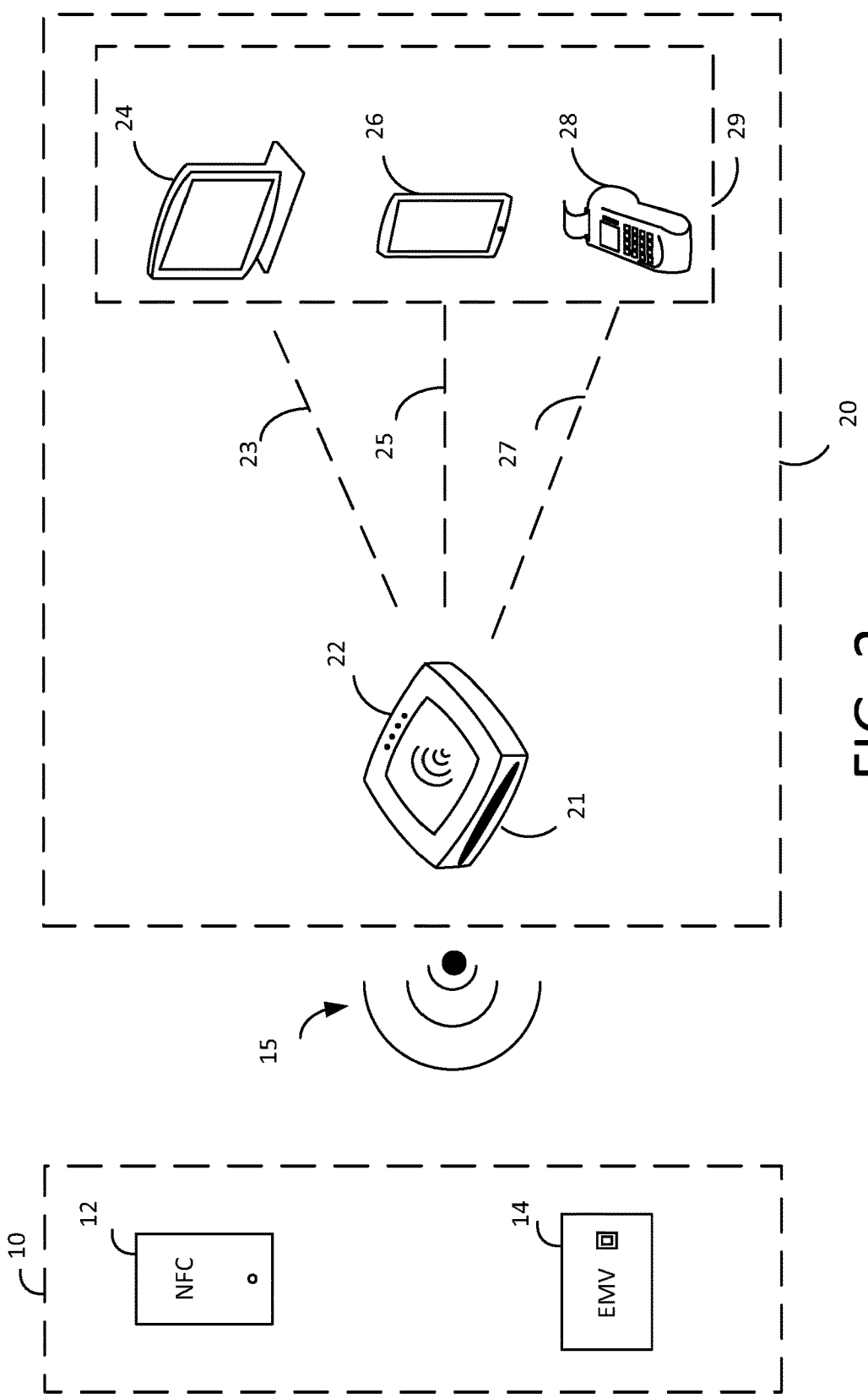
FIG. 2 depicts an illustrative block diagram of a payment device and payment terminal in accordance with some embodiments of the present disclosure.

FIG. 2 depicts an illustrative block diagram of payment device 10 and payment terminal 20 in accordance with some embodiments of the present disclosure. Although it will be understood that payment device 10 and payment terminal 20 of payment system 1 may be implemented in any suitable manner, in one embodiment the payment terminal 20 may comprise a payment reader 22 and a merchant device 29. However, it will be understood that as used herein, the term "payment terminal" may refer to the entire payment terminal 20 or any suitable component of the payment terminal 20, such as payment reader 22 or merchant device 29. In an embodiment, the payment reader 22 of payment terminal 20 may be a wireless communication device that facilitates transactions between the payment device 10 and a merchant device 29 running a point-of-sale application.

In one embodiment, payment device 10 may be a device that is capable of communicating with payment terminal 20 (e.g., via payment reader 22), such as a NFC device 12 or an EMV chip card 14. Chip card 14 may include a secure integrated circuit that is capable of communicating with a payment terminal such as payment terminal 20, generating encrypted payment information, and providing the encrypted payment information as well as other payment or transaction information (e.g., transaction limits for payments that are processed locally) in accordance with one or more electronic payment standards such as those promulgated by EMVCo. Chip card 14 may include contact pins for communicating with payment reader 22 (e.g., in accordance with ISO 7816) and in some embodiments, may be inductively coupled to payment reader 22 via a near field 15. A chip card 14 that is inductively coupled to payment reader 22 may communicate with payment reader 22 using load modulation of a wireless carrier signal that is provided by payment reader 22 in accordance with a wireless communication standard such as ISO 14443.

NFC device 12 may be an electronic device such as a smart phone, tablet, or smart watch that is capable of engaging in secure transactions with payment terminal 20 (e.g., via communications with payment reader 22). NFC device 12 may have hardware (e.g., a secure element including hardware and executable code) and/or software (e.g., executable code operating on a processor in accordance with a host card emulation routine) for performing secure transaction functions. During a payment transaction NFC device 12 may be inductively coupled to payment reader 22 via near field 15 and may communicate with payment terminal 20 by active or passive load modulation of a wireless carrier signal provided by payment reader 22 in accordance with one or more wireless communication standards such as ISO 14443 and ISO 18092.

Although payment terminal 20 may be implemented in any suitable manner, in one embodiment payment terminal 20 may include a payment reader 22 and a merchant device 29. The merchant device 29 runs a point-of-sale application that provides a user interface for the merchant and facilitates communication with the payment reader 22 and the payment server 40. Payment reader 22 may facilitate communications between payment device 10 and merchant device 29. As described herein, a payment device 10 such as NFC device 12 or chip card 14 may communicate with payment reader 22 via inductive coupling. This is depicted in FIG. 2 as near field 15, which comprises a wireless carrier signal having a suitable frequency (e.g., 13.56 MHz) emitted from payment reader 22.

In one embodiment, payment device 10 may be a contactless payment device such as NFC device 12 or chip card 14, and payment reader 22 and the contactless payment device 10 may communicate by modulating the wireless carrier signal within near field 15. In order to communicate information to payment device 10, payment reader 22 changes the amplitude and/or phase of the wireless carrier signal based on data to be transmitted from payment reader 22, resulting in a wireless data signal that is transmitted to the payment device. This signal is transmitted by an antenna of payment reader 22 that is tuned to transmit at 13.56 MHz, and if the payment device 10 also has a suitably tuned antenna within the range of the near field 15 (e.g., 0 to 10 cm), the payment device receives the wireless carrier signal or wireless data signal that is transmitted by payment reader 22. In the case of a wireless data signal, processing circuitry of the payment device 10 is able to demodulate the received signal and process the data that is received from payment reader 22.

When a contactless payment device such as payment device 10 is within the range of the near field 15, it is inductively coupled to the payment reader 22. Thus, the payment device 10 is also capable of modulating the wireless carrier signal via active or passive load modulation. By changing the tuning characteristics of the antenna of payment device 10 (e.g. by selectively switching a parallel load into the antenna circuit based on modulated data to be transmitted) the wireless carrier signal is modified at both the payment device 10 and payment reader 22, resulting in a modulated wireless carrier signal. In this manner, the payment device is capable of sending modulated data to payment reader 22.

In some embodiments, payment reader 22 also includes an EMV slot 21 that is capable of receiving chip card 14. Chip card 14 may have contacts that engage with corresponding contacts of payment reader 22 when chip card 14 is inserted into EMV slot 21. Payment reader 22 provides power to an EMV chip of chip card 14 through these contacts and payment reader 22 and chip card 14 communicate through a communication path established by the contacts.

Payment reader 22 may also include hardware for interfacing with a magnetic strip card (not depicted in FIG. 2). In some embodiments, the hardware may include a slot that guides a customer to swipe or dip the magnetized strip of the magnetic strip card such that a magnetic strip reader can receive payment information from the magnetic strip card. The received payment information is then processed by the payment reader 22.

Merchant device 29 may be any suitable device such as tablet payment device 24, mobile payment device 26, or payment terminal 28. In the case of a computing device such as tablet payment device 24 or mobile payment device 26, a point-of-sale application may provide for the entry of purchase and payment information, interaction with a customer, and communications with a payment server 40. For example, a payment application may provide a menu of services that a merchant is able to select and a series of menus or screens for automating a transaction. A payment application may also facilitate the entry of customer authentication information such as signatures, PIN numbers, or biometric information. Similar functionality may also be provided on a dedicated payment terminal 28.

Merchant device 29 may be in communication with payment reader 22 via a communication path 23/25/27. Although communication path 23/25/27 may be implemented via a wired (e.g., Ethernet, USB, FireWire, Lightning) or wireless (e.g., Wi-Fi, Bluetooth, NFC, or ZigBee) connection, in one embodiment payment reader 22 may communicate with the merchant device 29 via a Bluetooth low energy interface, such that the payment reader 22 and the merchant device 29 are connected devices. In some embodiments, processing of the payment transaction may occur locally on payment reader 22 and merchant device 29, for example, when a transaction amount is small or there is no connectivity to the payment server 40. In other embodiments, merchant device 29 or payment reader 22 may communicate with payment server 40 via a public or dedicated communication network 30. Although communication network 30 may be any suitable communication network, in one embodiment communication network 30 may be the internet and payment and transaction information may be communicated between payment terminal 20 and payment server 40 in an encrypted format such by a transport layer security (TLS) or secure sockets layer (SSL) protocol.

Figure 3:
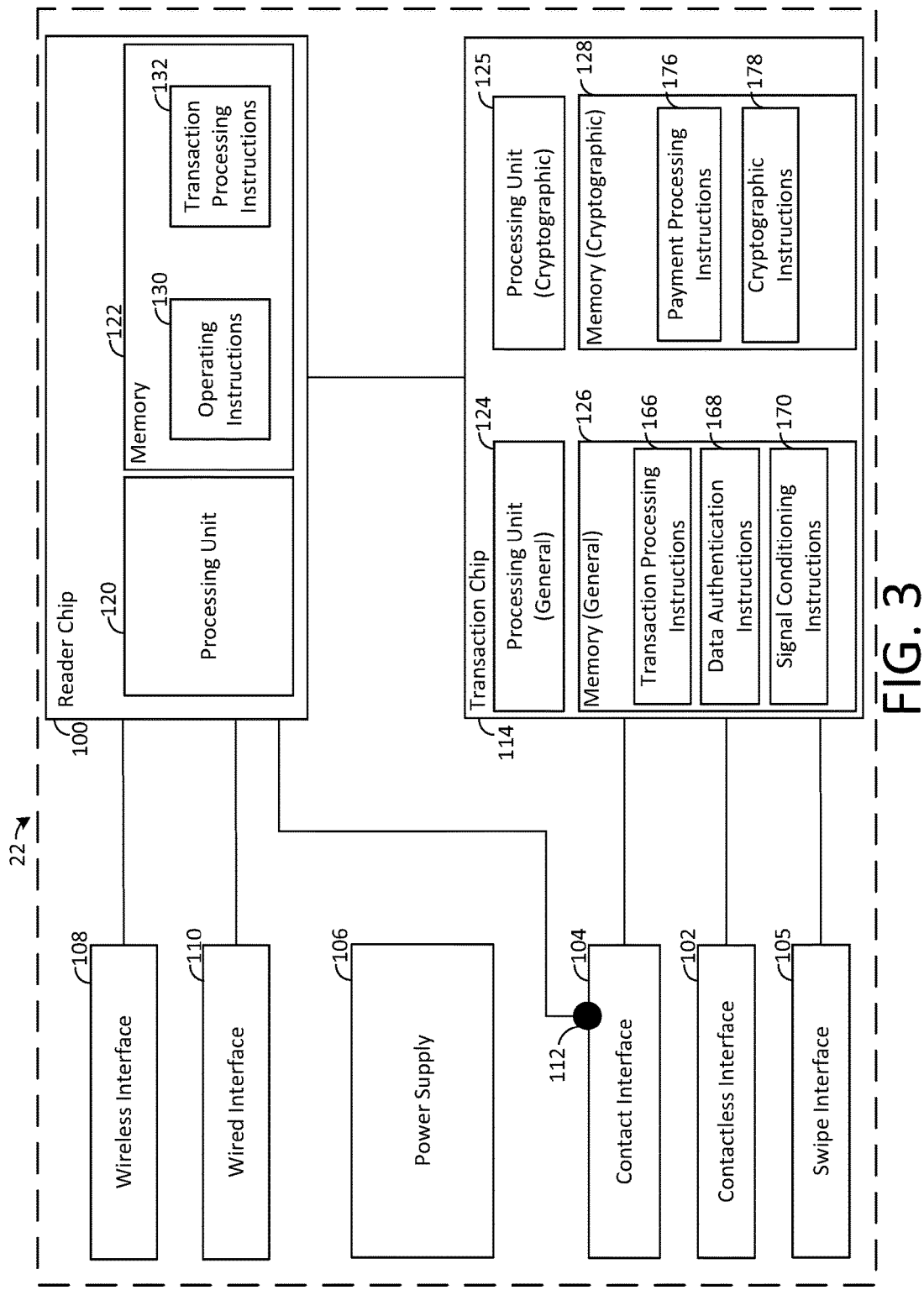
FIG. 3 depicts an illustrative block diagram of a payment reader in accordance with some embodiments of the present disclosure.

FIG. 3 depicts a block diagram of an exemplary payment reader 22 in accordance with some embodiments of the present disclosure. In one embodiment, payment reader 22 may be a wireless communication device that communicates wirelessly with an interactive electronic device such as a merchant device 29, for example, using Bluetooth classic or Bluetooth low energy. Although particular components are depicted in a particular arrangement in FIG. 3, it will be understood that payment reader 22 may include additional components, one or more of the components depicted in FIG. 3 may not be included in payment reader 22, and the components of payment reader 22 may be rearranged in any suitable manner. In one embodiment, payment reader 22 includes a reader chip 100, a plurality of payment interfaces (e.g., a contactless interface 102, a contact interface 104, and a swipe interface 105), a power supply 106, a wireless communication interface 108, a wired interface 110, and a transaction chip 114. Payment reader 22 also includes a processing unit 120 and memory 122 in reader chip 100, and general processing unit 124, cryptographic processing unit 125, general memory 126 and cryptographic memory 128 in transaction chip 114. Although in one embodiment the processing unit 120 and memory 122 will be described as packaged in a reader chip 100 and transaction chip 114 respectively, and configured in a particular manner, it will be understood that processing unit 120, general processing unit 124, cryptographic processing unit 125, memory 122, general memory 126, and cryptographic memory 128 may be configured in any suitable manner to perform the functionality of the payment reader 22 as is described herein. It will also be understood that the functionality of reader chip 100 and transaction chip 114 may be embodied in a single chip or a plurality of chips, each including any suitable combination of processing units and memory to collectively perform the functionalities of reader chip 100 and transaction chip 114 as described herein.

In some embodiments, payment reader 22 may include various interface elements (not depicted) for providing output to a user. In an embodiment, an interface element may provide indicators of progress of a transaction or processing at the payment reader 22. The interface element may be any suitable device for providing an output to a user of payment reader 22, such as a touchscreen, lights, a textual display, speaker, or other interface. In some embodiments, the interface elements may be configured to receive inputs from a user and provide the inputs to various resources of the payment reader 22, such as reader chip 100 and transaction chip 114.

In some embodiments, reader chip 100 may be any suitable chip, such as a K21 chip supplied by Freescale Semiconductor, Inc. Processing unit 120 of reader chip 100 of payment reader 22 may be any suitable processor and may include hardware, software, memory, and circuitry as is necessary to perform and control the functions of payment reader 22. Processing unit 120 may include one or more processors, and may perform the operations of reader chip 100 based on instructions in any suitable number of memories and memory types. In some embodiments, processing unit 120 may have multiple independent processing units, for example a multi-core processor or other similar component. Processing unit 120 may execute instructions stored in memory 122 of reader chip 100 to control the operations and processing of payment reader 22. As used herein, a processor or processing unit may include one or more processors having processing capability necessary to perform the processing functions described herein, including but not limited to hardware logic (e.g., hardware designed by software that describes the configuration of hardware, such as hardware description language (HDL) software), computer readable instructions running on a processor, or any suitable combination thereof. A processor may run software to perform the operations described herein, including software accessed in machine-readable form on a tangible non-transitory computer readable storage medium.

In an exemplary embodiment, the processing unit 120 of reader chip 100 may include two RISC processors configured to operate as a hub for controlling operations of the various components of payment reader 22, based on instructions stored in memory 122. As used herein, memory may refer to any suitable tangible or non-transitory storage medium. Examples of tangible (or non-transitory) storage medium include disks, thumb drives, and memory, etc., but does not include propagated signals. Tangible computer readable storage medium include volatile and non-volatile, removable and non-removable media, such as computer readable instructions, data structures, program modules or other data. Examples of such media include RAM, ROM, EPROM, EEPROM, SRAM, flash memory, disks or optical storage, magnetic storage, or any other non-transitory medium that stores information that is accessed by a processor or computing device.

Reader chip 100 may also include additional circuitry such as interface circuitry, analog front-end circuitry, security circuitry, and monitoring component circuitry. In one embodiment, interface circuitry may include circuitry for interfacing with a wireless communication interface 108 (e.g., Wi-Fi, Bluetooth classic, and Bluetooth low energy), circuitry for interfacing with a wired interface 110 (e.g., USB, Ethernet, FireWire, and Lightning), circuitry for interfacing with other communication interfaces or buses (e.g., I²C, SPI, UART, and GPIO), and circuitry for interfacing with a power supply 106 (e.g., power management circuitry, power conversion circuitry, rectifiers, and battery charging circuitry).

Transaction chip 114 may include one or more processors having processing capability necessary to perform the processing functions described herein, including but not limited to hardware logic, computer readable instructions running on a processor, or any suitable combination thereof. In an exemplary embodiment, transaction chip 114 may perform functionality relating to processing of payment transactions, interfacing with payment devices, cryptography, and other payment-specific functionality. In some embodiments, transaction chip 114 may include a general processing unit 124 for executing instructions associated with general payment functionality and a cryptographic processing unit 125 for handling cryptographic processing operations. Each of general processing unit 124 and cryptographic processing unit 125 may have dedicated memory associated therewith (i.e., general memory 126 and cryptographic memory 128). In this manner, specific cryptographic processing and critical security information (e.g., cryptographic keys, passwords, user information, etc.), may be securely stored and processed by cryptographic memory 128 and cryptographic processing unit 125.

One or both of general processing unit 124 and cryptographic processing unit 125 of transaction chip 114 may communicate with reader chip 100 (e.g., processing unit 120), for example, using any suitable internal bus and communication technique. In this manner, reader chip 100 and transaction chip 114 can collectively process transactions and communicate information regarding processed transactions (e.g., with merchant device 29).

Transaction chip 114 may also include circuitry for interfacing with a contact interface 104 (e.g., power and communication circuitry for directly interfacing with an EMV chip of a chip card 14 that is inserted into slot 21). In some embodiments, transaction chip 114 may also include analog front-end circuitry for interfacing with the analog components of contactless interface 102 (e.g., electromagnetic compatibility (EMC) circuitry, matching circuits, modulation circuitry, and measurement circuitry).

Contactless interface 102 may provide for NFC communication with a contactless device such as NFC device 12 or chip card 14. Based on a signal provided by reader chip 100, an antenna of contactless interface 102 may output either a carrier signal or a modulated signal. A carrier signal may be a signal having a fixed frequency such as 13.56 MHZ. A modulated signal may be a modulated version of the carrier signal according to a modulation procedure such as ISO 14443 and ISO 18092. When the payment reader 22 is inductively coupled to a contactless device, the contactless device may also modulate the carrier signal, which may be sensed by the contactless interface 102 and provided to the reader chip 100 for processing. Based on these modulations of the carrier signal, payment reader 22 and a contactless device are able to communicate information such as payment information.

Contact interface 104 may be a suitable interface for providing power to a payment chip such as an EMV chip of a chip card 14 and communicating with the EMV chip. Contact interface 104 may include a plurality of contact pins (not depicted in FIG. 3) for physically interfacing with the chip card 14 according to EMV specifications. In some embodiments, contact interface 104 may include a power supply (VCC) pin, a ground (GND) pin, a reset (RST) pin for resetting an EMV card, a clock (CLK) pin for providing a clock signal, a programming voltage (VPP) pin for providing a programming voltage to an EMV card, an input output (I/O) pin for providing for EMV communications, and two auxiliary pins. In this manner, the payment reader and the chip card are able to exchange information such as payment information.

In some embodiments, a chip card detection circuit 112 may be provided for the contact interface 104, and may detect when a chip card has been inserted into a chip card interface (e.g., card slot) of the contact interface 104. In exemplary embodiments, a chip card detection circuit may include suitable hardware (e.g., switches, optical detection circuits, proximity sensors, etc.) for detecting the presence of a chip card in the card slot of the contact interface 104. This signal may then be provided for processing by one or more other components of the payment reader 22 (e.g., reader chip 100 of payment reader 22).

Swipe interface 105 may provide an interface for reading information from a magnetic stripe ("magstripe") of a payment device, such as a credit or debit card, swiped through swipe interface 105. In some embodiments, swipe interface 105 may be in communication with transaction chip 114 and may provide electronic payment information received when a user swipes the magstripe through the swipe interface 105 to the transaction chip 114 for processing. In some embodiments, swipe interface 105 may include any suitable hardware for reading information from a magstripe of a payment card and providing the information to transaction chip 114.

In some embodiments, general processing unit 124 may include any suitable processor for performing the payment processing functionality of payment reader 22 described herein. In some embodiments, general memory 126 may be any suitable memory as described herein, and may include a plurality of sets of instructions for performing general transaction processing operations of payment reader 22, such as transaction processing instructions 166, data authentication instructions 168, signal conditioning instructions 170.

Transaction processing instructions 166 may include instructions for controlling general transaction processing operations of the payment reader 22, such as controlling the interaction between the payment reader 22 and a payment device 10 (e.g., for interfacing with a payment device via the contactless interface 102 and contact interface 104), selecting payment processing procedures (e.g., based on a payment processing entity associated with a payment method), interfacing with the cryptographic processor 125, and any other suitable aspects of transaction processing.

Data authentication instructions 168 may include instructions for providing configuration information for a payment terminal 20. The configuration information may include any suitable information, such as payment limits and types of transactions for local transactions (i.e., transactions that occur without contacting a payment server 40) and supported applications. As an example, in some embodiments, data authentication instructions 168 may include configuration instructions such as TMS-CAPK instructions. In some embodiments, the TMS-CAPK may be tailored for a particular jurisdiction (e.g., country-specific).

Signal conditioning instructions 170 may include instructions for conditioning signals received from a payment device 10 via the contactless interface 102 (e.g., from a NFC payment device 10). Although in some embodiments, signal conditioning instructions 170 may include instructions for manipulating signals received via contactless interface 102, signal conditioning instructions 170 may include instructions for conditioning signals using any suitable hardware, logic, or algorithm required to process NFC signals received via contactless interface 102.

Cryptographic processing unit 125 may be any suitable a processor as described herein, and, in some embodiments, may perform cryptographic functions for the processing of payment transactions. For example, in some embodiments a cryptographic processing unit 125 may encrypt and decrypt data based on one or more encryption keys, in a manner that isolates the encryption functionality from other components of payment reader 22 and protects the encryption keys from being exposed to other components of payment reader 22.

In some embodiments, cryptographic memory 128 may be any suitable memory or combination thereof as described herein, and may include a plurality of sets of instructions for performing cryptographic operations, such as payment processing instructions 176 and cryptographic instructions 178. Payment processing instructions 176 may include instructions for performing aspects of payment processing, such as providing for encryption techniques to be used in association with particular payment procedures, accessing account and processing information, any other suitable payment processing functionality, or any suitable combination thereof. Cryptographic instructions 178 may include instructions for performing cryptographic operations. Cryptographic processing unit 125 may execute the cryptographic instructions 178 to perform a variety of cryptographic functions, such as to encrypt, decrypt, sign, or verify a signature upon payment and transaction information as part of a payment transaction.

Wireless communication interface 108 may include suitable wireless communications hardware (e.g., antennas, etc.) and one or more processors having processing capability necessary to engage in wireless communication (e.g., with a merchant device 29 via a protocol such as Bluetooth low energy) and control associated circuitry, including but not limited to hardware logic, computer readable instructions running on a processor, or any suitable combination thereof. Although wireless communication interface 108 may be implemented in any suitable manner, in an exemplary embodiment, wireless communication interface 108 may be implemented as a Texas Instruments CC2640 device, which may include a processing unit (not depicted) and memory (not depicted).

Power supply 106 may include one or more power supplies such as a physical connection to AC power or a battery. Power supply 106 may include power conversion circuitry for converting an AC or DC power source into a plurality of DC voltages for use by components of payment reader 22. When power supply 106 includes a battery, the battery may be charged via a physical power connection, via inductive charging, or via any other suitable method. Although not depicted as physically connected to the other components of the payment reader 22 in FIG. 3, power supply 106 may supply a variety of voltages to the components of the payment reader 22 in accordance with the requirements of those components.

Wired interface 110 may include any suitable interface for wired communication with other devices or a communication network, such as USB, Lightning, FireWire, Ethernet, any other suitable wired communication interface, or any combination thereof. In some embodiments, wired interface 110 may allow payment reader to communicate with one or both of merchant device 29 and payment server 40.

Memory 122 of reader chip 100 may include a plurality of sets of instructions for controlling operations of payment reader 22, such as operating instructions 130 and transaction processing instructions 132.

Operating instructions 130 may include instructions for controlling general operations of the payment reader 22, such as internal communications, power management, processing of messages, system monitoring, sleep modes, user interface response and control, operation of the wireless interface 108, operation of the transaction chip 114, and the management of the other sets of instructions. In one embodiment, the operating instructions 130 may provide the operating system and applications necessary to perform most of the processing operations that are performed by the processing unit 120 of the reader chip 100 of payment reader 22.

Operating instructions 130 may also include instructions for interacting with a merchant device 29. In one embodiment, the merchant device 29 may be running a point-of-sale application. The operating instructions 130 may include instructions for a complementary application to run on processing unit 120 of reader chip 100, in order to exchange information with the point-of-sale application. For example, the point-of-sale application may provide a user interface that facilitates a user such as a merchant to engage in purchase transactions with a customer. Menus may provide for the selection of items, calculation of taxes, addition of tips, and other related functionality. When it is time to receive payment, the point-of-sale application may send a message to the payment reader 22 (e.g., via wireless interface 108). The operating instructions 130 facilitate processing of the payment, for example, by acquiring payment information via the contactless interface 102 or contact interface 104, by invoking the transaction chip 114 to process that payment information, and by generating responsive messages that are transmitted to the point-of-sale application of the merchant device via wireless interface 108.

Operating instructions 130 may also include instructions for interacting with a payment service system 50 at a payment server 40. In one embodiment, a payment service system 50 may be associated with the payment reader 22 and the point-of-sale application of the merchant device 29. For example, the payment service system 50 may have information about payment readers 22 and merchant devices 29 that are registered with the payment service system 50 (e.g., based on unique identifiers). This information may be used to process transactions with servers of the merchant and customer financial institutions, for providing analysis and reports to a merchant, and aggregating transaction data. The payment reader 22 may process payment information (e.g., based on operation of reader chip 100 and transaction chip 114) and communicate the processed payment information to the point-of-sale application, which in turn communicates with the payment service system 50. In this manner, messages from the payment reader 22 may be forwarded to the payment service system 50 of payment server 40, such that the payment reader 22 and payment service system 50 may collectively process the payment transaction.

Transaction processing instructions 132 may include instructions for processing payment transactions at payment reader 22. In one embodiment, the transaction processing instructions may be compliant with a payment standard such as those promulgated by EMV. Depending on the payment method that is being used (e.g., Europay, Mastercard, Visa, American Express, etc.), a particular processing procedure associated with the payment method may be selected and the transaction may be processed according to that procedure. When executed by processing unit 120, these instructions may determine whether to process a transaction locally, how payment information is accessed from a payment device, how that payment information is processed, which cryptographic functions to perform, the types of communications to exchange with a payment server, and any other suitable information related to the processing of payment transactions. In some embodiments, transaction processing instructions 132 may perform high level processing, and provide instructions for processing unit 120 to communicate with transaction chip 114 to perform most transaction processing operations.

Transaction processing instructions 132 may include pre-charge instructions for communicating payment information with a payment device when performing pre-charge operations during a payment transaction. In some embodiments, transaction processing instructions 132 may include instructions for handling transactions intended to provide preliminary charges to a chip card for processing by the payment reader 22 until the payment transaction is completed (e.g., at a point of sale application running on a merchant device 29 in communication with the payment reader). In some embodiments, the preliminary charge or charges may provide a dummy charge amount in order for the chip card to produce an authorization response (e.g., an authorization response cryptogram). Depending on when the pre-charge request is received from the merchant device, this authorization response may be transmitted back to the merchant device (e.g., via wireless interface 108 or wired interface 110) prior to the merchant completing the payment transaction.

In some embodiments, it may be desired for an authorization response returned during pre-charge to be processed with a payment amount that matches the actual payment amount of the transaction to be completed by the merchant. Such a pre-charge may include acquiring a plurality of preliminary payment amounts for authorization by a chip card based on the transaction processing instructions 132. The reader chip 100 may receive each of the plurality of preliminary payment amounts in a message, such as from point-of-sale application at the merchant device 29 or payment server 40. As described in greater detail below, in some embodiments, the plurality of preliminary payment amounts may be determined arbitrarily and provided to the payment reader 22 for use by the reader chip 100. In other embodiments, the plurality of preliminary payment amounts may be derived based on predictive techniques using historical data for the merchant device 29, and in some embodiments, data from other payment terminals 20, as will be discussed further hereafter. The transaction processing instructions 132 may include instructions for continuing to provide preliminary charges until an actual payment amount is received (e.g., processing of payment information from the payment transaction is complete).

In other embodiments, the transaction processing instructions 132 may include instructions for receiving an indicator that a charge request is a pre-charge request, may assign a priority to the indicator associated with the pre-charge request, and store the indicator and its assigned priority in memory, such as memory 122. In this regard, the reader chip 100 may prioritize or deprioritize a pre-charge request based on the indicator. In some embodiments, the reader chip 100 may secure authorization for each pre-charge request in order of priority (e.g., from highest to lowest prioritization). In some embodiments, transaction processing instructions 132 may include instructions for assigning priority proportionally with regard to a score assigned to a preliminary payment amount that is indicative of a likelihood that the preliminary payment amount will match an actual payment amount for the transaction. In yet other embodiments, the reader chip 100 may store and prioritize or deprioritize a request for payment information without regard to whether the request is a pre-charge request using instructions stored in transaction processing instructions 132.

Transaction processing instructions 132 may include instructions for collecting information other than payment information before a charge is initiated during a payment transaction. For example, when a chip card is inserted into the contact interface 104 but before transaction chip 114 requests electronic payment information from (i.e., charges) the card, the reader chip 100 may collect other information needed for processing the payment transaction from the chip card, such as details about the chip card, an identity of a customer financing institution or issuer that issued the chip card, an account number, an expiration date of the chip card, or other information. In addition, transaction processing instructions 132 may include instructions for determining information about a customer using the payment device, including an identity of the customer, transaction history, or other information. In some embodiments, transaction processing instructions 132 may include instructions for collecting any suitable information from a payment device 10 prior to requesting electronic payment information or otherwise initiating a charge at the payment device 10.

Figure 4:
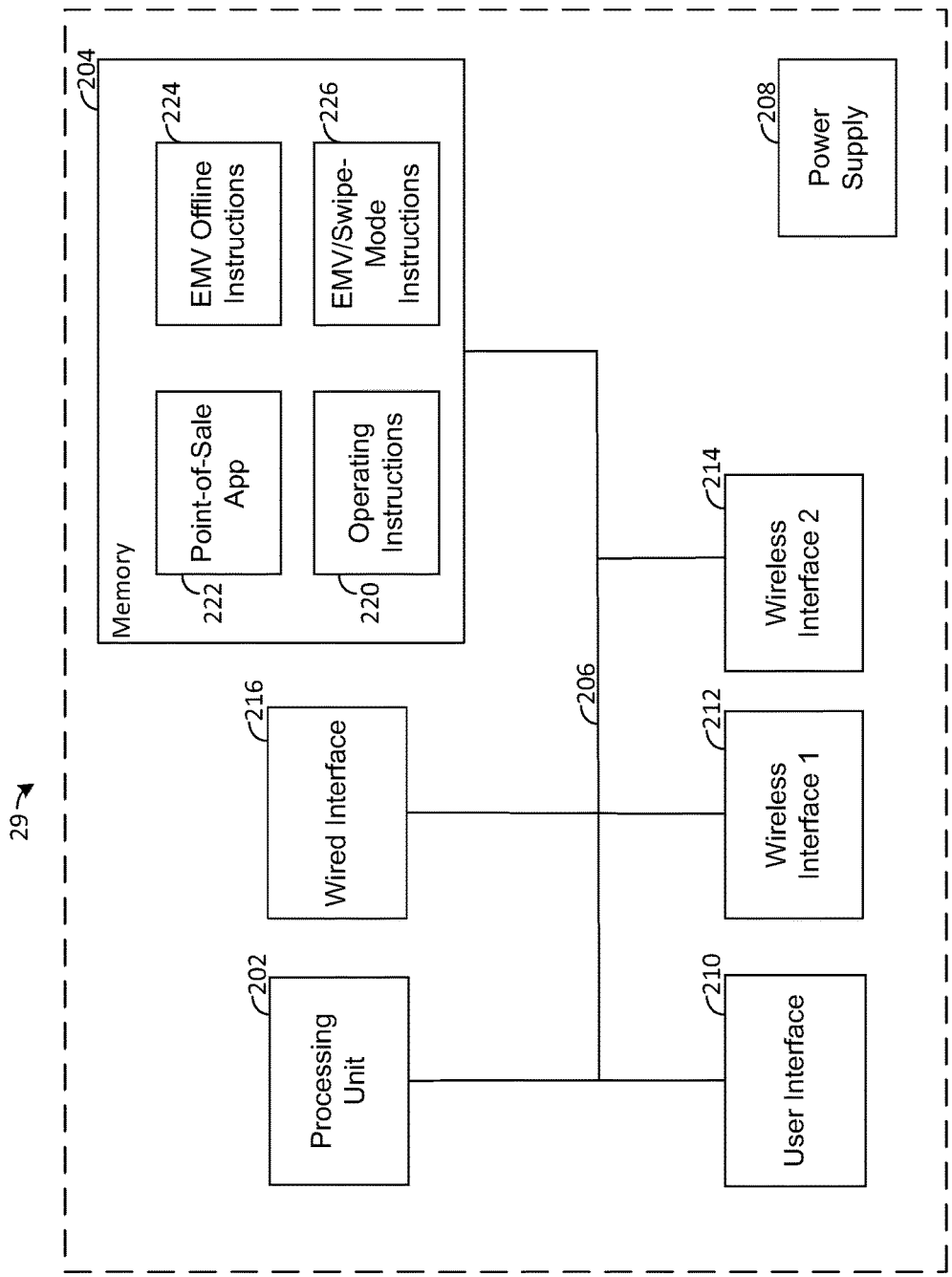
FIG. 4 depicts an illustrative block diagram of a merchant device in accordance with some embodiments of the present disclosure.

FIG. 4 depicts an exemplary merchant device 29 in accordance with some embodiments of the present disclosure. Although a merchant device 29 may be implemented in any suitable manner, in one embodiment the merchant device 29 may be an interactive electronic device that provides a user interface and communicates with one or more other devices. Examples of interactive electronic devices include tablets, smart phones, smart watches, desktop computers, laptop computers, custom electronic devices, or any other suitable electronic device having the necessary user interface and communication capabilities to perform the functions described herein.

Although particular components are depicted in a particular arrangement in FIG. 4, it will be understood that merchant device 29 may include additional components, one or more of the components depicted in FIG. 4 may not be included in merchant device 29, and the components of merchant device 29 may be rearranged in any suitable manner. In one embodiment, merchant device 29 includes a processing unit 202, a memory 204, an interface bus 206, a power supply 208, a user interface 210, a first wireless interface 212, a second wireless interface 214, and a wired interface 216.

In one embodiment, the merchant device 29 includes a processing unit 202 and memory 204 that are configured to control and perform the necessary operations of the merchant device 29. In one embodiment, the processing unit 202 may be a general purpose processor running instructions for a mobile operating system, programs, and applications based on instructions that may be stored in memory 204. The memory 204 may include any suitable memory types or combination thereof as described herein, such as flash memory and RAM memory, for storing instructions and other data and providing a working memory for the execution of the operating system, programs, and applications of the merchant device 29. In one embodiment, the memory 204 may include a plurality of sets of instructions, such as operating instructions 220, point-of-sale application instructions 222, EMV offline instructions 224, and EMV/swipe mode instructions 226.

The processing unit 202 may execute the instructions of memory 204 to interact with and control one or more other components of the merchant device 29. Although the processing unit 202 may communicate with other components of the merchant device 29 in any suitable manner, in one embodiment the processing unit may utilize an interface bus 206. Interface bus 206 may include one or more communication buses such as I2C, SPI, USB, UART, and GPIO. In one embodiment, the processing unit 202 may execute instructions of the memory and based on those instructions may communicate with the other components of the merchant device 29 via the communication buses of interface bus 206.

Merchant device 29 may also include a power supply 208. Power supply 208 may include power conversion circuitry for converting AC power and/or generating a plurality of DC voltages for use by components of merchant device 29. When power supply 208 includes a battery, the battery may be charged via a physical power connection, via inductive charging, or via any other suitable method. Although not depicted as physically connected to the other components of merchant device 29 in FIG. 4, power supply 208 may supply a variety of voltages to the components of merchant device 29 in accordance with the requirements of those components.

Merchant device 29 may also include a user interface 210. User interface 210 may provide various options for the user of the merchant device 29 to interact with applications and programs running on the merchant device 29. An exemplary user interface 210 may include hardware and software for any suitable user interface, such as a touchscreen interface, voice command interface, keyboard, mouse, gesture recognition, any other suitable user interface, or any combination thereof. In one embodiment, the user interface 210 may be a touchscreen interface that displays an interactive user interface for programs and applications such as a point-of-sale application running on the merchant device 29.

Merchant device 29 may also include a plurality of wireless communication interfaces. The wireless communication interfaces may include any suitable hardware and software for providing a wireless communication interface such as Bluetooth classic, Bluetooth low energy, WiFi, cellular, short message service (SMS), NFC, any other suitable wireless communication interface, or any combination thereof. In an embodiment, a first wireless communication interface 212 may be a wireless communication interface that primarily communicates with payment reader 22 (e.g., Bluetooth low energy interface) while a second wireless communication interface 214 may be a wireless communication interface (e.g., WiFi) that primarily communicates with a payment service system 50 of payment server 40 (e.g., via the internet).

Merchant device may also include a wired interface 216, which may include any suitable interface for wired communication with other devices or a communication network, such as USB, Lightning, FireWire, Ethernet, any other suitable wired communication interface, or any combination thereof.

Operating instructions 220 may include instructions for controlling any suitable general operations of the merchant device 29, such as internal communications, power management, control of I/O devices, control of communication devices, control of other hardware of the merchant device 29, any other suitable instructions, or any combination thereof. In one embodiment, the operating instructions may provide instructions for the operating system of the merchant device 29 as well as most drivers, programs, and applications operating on the merchant device 29.

Operating instructions 220 may include instructions for controlling the operations of the user interface 210. The user interface 210 may be controlled in accordance with the instructions of programs and applications of the operating instructions 220, point-of-sale application instructions 222, EMV offline instructions 224, and EMV/swipe mode instructions 226. In one embodiment, the operating instructions 220 may include instructions to display information about an EMV offline mode or EMV/swipe mode. Operating instructions 220 may also include instructions for interacting with a payment reader 22 and for interacting with a payment service system 50 at a payment server 40. The payment reader 22 and/or the application running on the merchant device 29 may be known (e.g., via a registration process) to the payment service system 50, such that the merchant device 29 may process payments with the payment service system 50 according to the point-of-sale application instructions 222.

Point-of-sale application instructions 222 include instructions for running a point-of-sale application on the merchant device 29. When executed by the processing unit 202, the point-of-sale application instructions 222 may provide for a rich display of an interactive interface that allows a merchant to process payment transactions with customers. These instructions may include customized interfaces that allow the merchant or customer to select products for purchase, calculate sales tax, process tips, provide receipts, generate discounts or special offers, process customer loyalty programs, search for items in inventory or for delivery, and perform any other suitable retail operations. In some embodiments, the point-of-sale application instructions 222 may include instructions for providing a rich display of information relating to expedited processing modes such as EMV offline mode or EMV/swipe mode.

In some embodiments, point-of-sale application instructions 222 may include instructions for a processing request to enter an expedited processing mode. In some embodiments, the point-of-sale application instructions 222 may receive a request from a user to enter an expedited processing mode, such as via user interface 210. In an exemplary embodiment, various conditions may occur that make processing payment transactions using normal procedures impractical, such as when a connection is lost between the payment terminal 20 and payment server 40 and payment terminal 20 is unable to communicate with payment server 40. As discussed further below, entering an expedited processing mode may enable the merchant device 29 to continue processing payment transactions until a connection between payment terminal 20 and payment server 40 may be restored. In addition, normal processing operations may be impractical during peak transaction times or other times when large crowds may visit a merchant location and customers making purchases may experience long lines or wait times before they may provide payment and leave the merchant's store. Entering a swipe mode at the merchant device 29 may permit customers to take advantage of faster processing of payment information available through processing the transaction by swiping a payment device with a magstripe.

In some embodiments, point-of-sale application instructions 222 may include instructions for receiving an input from a user at the user interface 210 requesting entry into the expedited processing mode. For example, in some embodiments, point-of-sale application instructions 222 may display an opt-in request in response to the request to enter expedited processing mode. In some embodiments, point-of-sale application instructions 222 may require the user to accept the opt-in request before the user may execute an expedited processing mode. In this regard, the user may accept or decline the opt-in request from point-of-sale application instructions 222. If the user declines the request, point-of-sale application instructions 222 may process the transaction normally, without entering the expedited processing mode. If the user accepts, the point-of-sale application instructions 222 may permit the user to proceed with steps in the mode for which the user has accepted an opt-in request (e.g., an EMV offline mode or swipe mode).

In some embodiments, point-of-sale application instructions 222 may include instructions for providing and displaying a user interface framework and notifications or disclosures related to the expedited processing mode. For example, the user may receive a notification after accepting the opt-in request that a payment transaction will be performed according to the expedited processing mode. In some embodiments, point-of-sale application instructions 222 may provide a notification to the user of a liability shift that may occur as part of the expedited processing mode, such as from an issuer of a payment device 10 (e.g., a chip card or swipe card) to a merchant using payment terminal 20 to process payment transactions. Other notifications or disclosures may be provided in other embodiments. In one embodiment, point-of-sale application instructions 222 may provide to a user any information related to the expedited processing mode for which disclosure may be required or appropriate.

In some embodiments, point-of-sale application instructions 222 may include instructions for providing various notifications to the processing element 202 of merchant device 29 in response to acceptance of an opt-in request by a user. In some embodiments, a notification may include an indication that the transaction is being processed in expedited processing mode according to an expedited payment protocol. In some embodiments, the processing unit 202 may perform steps of the expedited processing mode in response to the notification. In some embodiments, a notification may include an indication of a reason that a transaction will be processed as a swipe mode transaction. For example, the notification may indicate that payment information will be received by reading a magstripe at the swipe interface 105 because a request to the enter swipe mode has been received and a user has accepted the opt-in request, not because a failure to read a chip card at the payment terminal 20 has resulted in processing the transaction as a technical fallback transaction (e.g., when allowing a user to swipe a chip card because the payment reader 22 cannot read the EMV chip). The notification may provide other information in response to acceptance of an opt-in request by a user in other embodiments.

EMV offline instructions 224 may include instructions for entering the EMV offline mode at the merchant device 29 and processing payment information from a payment device 10 (e.g., a chip card) in the EMV offline mode. In some embodiments, EMV offline instructions 224 may cause the merchant device 29 to enter the EMV offline mode in response to various events. Based on EMV offline instructions 224, the merchant device 29 may enter the EMV offline mode when a user accepts an opt-in request at the user interface 210, when processing unit 202 determines that a communication interface (e.g., wireless interface 214) of the merchant device 29 is unable to communicate with one or more payment servers, when a latency of communication between merchant device 29 and a payment server 40 is above a threshold, or in response to other occurrences or other criteria.

In some embodiments, EMV offline instructions 224 may include instructions for processing electronic payment information from a chip card as part of the EMV offline mode. The steps of the EMV offline mode may include aspects of existing EMV processing tasks for providing payment authorization in response to an electronic payment response from a chip card, such as transaction processing using Visa® QuickChip for EMV® or other similar processing operations. For example, in some embodiments, EMV offline instructions may request and receive electronic payment information from the chip card, as part of the expedited processing mode. The EMV offline instructions 224 may cause processing unit 202 to provide a request to payment reader 22 for an electronic payment response from a chip card at a chip card interface 104 of payment reader 22. In some embodiments, the request for an electronic payment response may be provided in response to a first request for payment received at the point-of-sale application 222 or otherwise.

In some embodiments, EMV offline instructions 224 may include instructions for receiving an electronic payment response. In some embodiments, the electronic payment response may be provided by a chip card inserted at contact interface 104 of the payment reader 22. The chip card may perform risk management in response to the request for electronic payment response and either decline to approve the transaction offline or provide information required for an online authorization request. In some embodiments, the information provided by the chip card may include an authorization request cryptogram ("ARQC") or other similar information required to perform online authorization of an electronic payment request. Other steps for receiving an electronic payment response from payment reader 22 may be performed in some embodiments.

In some embodiments, EMV offline instructions 224 may include instructions for assigning a time indicator or time-stamp to an electronic payment response received from payment reader 22. EMV offline instructions 224 may include instructions for associating the electronic payment response with one or more time indicators depending on various factors and requirements applicable to the transaction. For example, as described further below, electronic payment response processing at one or more payment servers may require a time indicator associated with an electronic payment response to falls within a range of time for the particular transaction. In some embodiments, the time indicator may correspond to a time when the chip card provided the electronic payment response, for example, when required for processing of the electronic payment response (e.g., the time indicator is part of a hash or ARQC required for response authentication). In this regard, more than one time indicator may be associated with the electronic payment response in some embodiments, for example, when an amount of time between the time when the chip card provided the electronic payment response and the time when one or more payment servers receive the electronic payment response exceeds a threshold (e.g., a latency threshold). In some embodiments, the associated time indicator may specify transmission to a payment server at the soonest possible time in the future, or at a pre-scheduled time. In some embodiments, EMV offline instructions 224 may include instructions for assigning a plurality of time indicators to an electronic payment response from a chip card. In this regard, one of the plurality of time indicators may match a time within the range of time for the transaction required by the one or more payment servers. In some embodiments, the time indicator associated with an electronic payment response may enable merchant device 29 to schedule a time for sending the electronic payment response to the one or more payment servers based on EMV offline instructions 224.

In some embodiments, EMV offline instructions 224 may include instructions for storing payment transaction information as an offline transaction in memory 204 of the merchant device 29. The payment transaction information may include an electronic payment response, one or more associated time indicators or a payment type indicator. In some embodiments, the payment type indicator may include information about a payment device 10 that provided an electronic payment response, such as a chip card. In some embodiments, the indicator may include an indicator that a liability shift, such as from a chip card issuer to merchant has or has not occurred.

In some embodiments, EMV offline instructions 224 may include instructions for approving a transaction associated with an electronic payment response. The approval may be based on standard EMV processing steps at the merchant device 29, such as EMV processing carried out during normal operations at the merchant device 29. In some embodiments, EMV offline instructions 224 may include instructions for providing the approval as an offline approval, such as a notification first electronic payment response may be received at the merchant device 29. In some embodiments, the EMV offline instructions 224 may provide a notification for a user (e.g., to the user interface) following the approval prompting removal of the chip card from the chip card interface 104. The user may remove the chip card before transmission of any information associated with the transaction occurs, such as the electronic payment response or other information. In this regard, a payment transaction time perceived by a user may be decreased.

EMV offline instructions 224 may include instructions for performing the foregoing steps when additional payment requests are received at the merchant device 29. In some embodiments, EMV offline instructions 224 may include instructions for requesting additional electronic payment responses in response to additional requests for payment at the user interface, storing the additional electronic payment responses in memory 204, and approving additional transactions associated with the additional electronic payment responses. The steps may be repeated as often as necessary for any payment requests received at the user interface 210 of merchant device 29.

In some embodiments, EMV offline instructions 224 may include instructions for transmitting a payment approval request to one or more payment servers. In some embodiments, the payment approval request may comprise one or more electronic payment responses and an associated payment-type indicator for each electronic payment response. In some embodiments, the payment type indicator may indicate to one or more payment servers that one or more electronic payment responses are to be processed according to an expedited payment protocol. Under the expedited payment protocol (e.g., Visa quick chip), the transaction may be approved without any further communications between the payment server and the chip card. This allows the chip card to be removed earlier in the payment process (e.g., after the electronic payment response is transmitted, at a particular stage of a transaction, or upon preliminary approval by a merchant device. In addition, the payment approval request may comprise an indicator comprising information about a liability shift, such as an indicator that a liability shift to the merchant has occurred.

In some embodiments, EMV offline instructions 224 may include instructions for transmitting a payment approval request at a variety of times or in response to a variety of events. For example, in some embodiments, after storing one or more electronic payment responses in memory, EMV offline instructions 224 may include an option to send one or more payment approval requests to one or more payment servers based on a determination that the one or more payment approval requests may be transmitted. EMV offline instructions may determine that the one or more payment approval requests may be transmitted based on a determination that a communication interface of payment terminal 20 (e.g., wireless interface 214 of merchant device 29) is available. In this regard, processing unit 202 (based on EMV offline instructions 224) may check whether the communication interface is able to communicate with one or more payment servers (e.g., payment server 40) in any suitable manner, such by as monitoring transmissions received at the communication interface or by receiving a response from the one or more payment servers to a message transmitted from the communication interface. In some embodiments, EMV offline instructions 224 may include instructions for performing the check after a first electronic payment response is received at the merchant device 29. In some embodiments, EMV offline instructions 224 may include instructions for determining that a frequency of payment requests is less than a threshold as part of determining that a payment approval request may be transmitted. In this regard, EMV offline instructions 224 may include instructions for noting a time at which each payment request is received at the user interface 210 and comparing a frequency of the requests with a pre-defined threshold. The threshold may be updated from time-to-time based on various factors, such as a latency of communication between the payment terminal 20 and payment server 40, or other similar information.

In some embodiments, EMV offline instructions 224 may include instructions for forwarding one or more payment approval requests to one or more payment servers if the communication interface is able to communicate with them. In some embodiments, EMV offline instructions 224 may assign a time indicator to the payment approval request, such as when a time indicator is not part of an ARQC associated with an electronic payment response. In some embodiments, EMV offline instructions 224 may include instructions for waiting to send a payment approval request to one or more payment servers until a time indicated by a time indicator associated with the payment approval request. The time indicated by the time indicator may be a particular or explicit time, an elapsed time, or a conditional time. For example, the time indicated by the time indicator may be based on a determination that a latency of communication between payment terminal 20 and a payment server 40 has fallen below a threshold, or that a frequency of payment requests has fallen below a threshold. The time indicator may include other information in other embodiments.

EMV offline instructions 224 may include instructions forwarding a payment approval request at a time corresponding to the time of the associated time indicator. The time corresponding to the time indicator may be a future time at which the payment approval request is scheduled to be sent. In some embodiments, a plurality of payment approval requests may be associated with respective time indicators corresponding to a similar time. In this regard, EMV offline instructions may process multiple payment approval requests at a time corresponding to the time associated with the time indicator. In some embodiments, EMV offline instructions 224 may include instructions for forwarding a payment approval request and its associated time indicator to one or more payment servers at a time prior to a time corresponding to the time of the time indicator. In this regard, the one or more payment servers may wait to process the payment approval request until the time corresponding to the time of the time indicator. In some embodiments, EMV offline instructions 224 may include instructions for forwarding a payment approval request to an intermediate server, which may forward the payment approval request to one or more payment servers at a later time. In some embodiments, EMV offline instructions 224 may include instructions for forwarding to one or more payment servers all payment approval requests available for transmission for a given time. EMV offline instructions 224 may include instructions for processing payment approval requests using other techniques in other embodiments.

EMV offline instructions 224 may include instructions for receiving a payment approval response in response to a payment approval request sent to one or more payment servers. In some embodiments, the payment approval response may be associated with one or more payment approval requests, and may indicate that a particular payment transaction has been approved or declined, such as by a chip card issuer. In some embodiments, EMV offline instructions 224 may include instructions for providing a notification to user interface 210 of ultimate approval or denial of the payment approval request indicated by a payment approval response. Payment approval responses may be received for each payment approval request sent to the one or more payment servers.

Discussion now will turn to an embodiment in which the merchant device 29 may comprise a swipe interface 105, and may be configured to process payment transactions with a chip card in a swipe mode. Under some circumstances, payment terminal 20 may be unable to process a payment transaction in which a customer attempts to provide electronic payment information using a chip card. In some instances, damage to an EMV chip of a chip card, improper use, various hardware and software issues at a payment terminal 20, or other problems may prevent processing of payment information using normal EMV procedures. Processing of EMV chip cards may be performed using a magstripe when a payment reader 22 is unable to read payment information using normal EMV processing. In general, the process for "falling back" to allow processing of payment information from a chip card using the chip card's magstripe may be referred to as a "fallback transaction." During a swipe transaction involving a card with a magstripe but no EMV chip, liability for risk of non-payment in the event a transaction is declined shifts from card issuer to merchant accepting the swipe transaction. However, no liability shift occurs as part of a technical fallback transaction (e.g., where the fallback transaction occurred as a result of technical problems with the payment procedure), and liability remains with the card issuer. In order to permit a merchant to opt-in to permit a payment transaction involving a chip card to be processed as a swipe transaction, card issuers and various regulatory authorities may require liability for non-payment to shift to the merchant. Acceptance of a request to shift liability from a card issuer to a merchant may permit the merchant to operate payment terminal 20 in a swipe mode, thereby achieving faster payment transaction processing and reduced checkout time.

EMV/swipe mode instructions 226 may include instructions for causing payment terminal 20 to enter a swipe mode. In some embodiments, EMV/swipe mode instructions 226 may include instructions for determining when to enter swipe mode at the merchant device 29. For example, the merchant device 29 may enter swipe mode in response to a request to enter swipe mode received at user interface 210 (e.g., by user input at point-of-sale application 222) or a determination that certain criteria (e.g., queue size, transaction frequency, etc.) meet a threshold. In some embodiments, the request to enter swipe mode may be provided in response to a request for payment information at the user interface 210, or when a chip card is detected at the payment terminal 20, such as at contact interface 104.

In some embodiments, EMV/swipe mode instructions 226 may require a user to accept a request to opt-in or accept a liability shift from card issuer to merchant before permitting the payment transaction to proceed by executing the steps of the swipe mode. If a user declines to accept the opt-in request, the processing of the payment transaction for which the request was provided may continue according to normal processing operations (e.g., requiring a chip card to be processed through the chip card interface rather than the magstripe interface). Acceptance of the opt-in request may permit the merchant device 29 to execute the steps for processing a payment transaction in swipe mode. The opt-in request may include any suitable information for display to a user in conjunction with the opt-in request, such as notifications and disclosures related to the liability shift to the merchant or other information. In some embodiments, EMV/swipe mode instructions 226 may include instructions for providing an opt-in request in response to various events, such as when a user provides a request via user interface 210, a determination that a merchant is experiencing high customer volume (e.g., based on information from sensors or cameras), when a time between payment transactions at a payment terminal falls below a threshold amount of time, or other events indicating that a customer may experience delays in completing a payment transaction at the payment terminal 20.

In some embodiments, EMV/swipe mode instructions 226 may include instructions for processing electronic payment information of a swipe payment type as part of swipe mode operations. A user may provide a payment transaction request at user interface 210. In some embodiments, EMV/swipe mode instructions 226 may include instructions for receiving electronic payment information from a payment card magstripe swiped through swipe interface 105 in response to a payment transaction request at user interface 210. The electronic payment information may include information provided as part of a conventional swipe payment transaction, such as card issuer information and card and cardholder identification.

EMV/swipe mode instructions 226 may include instructions for generating and associating indicators with electronic payment information received during swipe mode. In some embodiments, EMV/swipe mode instructions 226 may generate a swipe mode indicator based on the payment terminal entering swipe mode. The swipe mode indicator may permit electronic payment information to be processed according to procedures for processing swipe payment type. In addition, the swipe mode indicator may indicate that the transaction is not a technical fallback transaction. Because the chip card is being operated in the swipe mode in the absence of technical fallback, the indicator may inform payment servers that the transaction should be processed as a swipe transaction requiring a liability shift to the merchant. In some embodiments, EMV/swipe mode instructions 226 may generate an indicator that a payment card that provided the electronic payment information is a chip card. The indicator that the payment card is a chip card may be based on any suitable information, including a notification received at the merchant device 29 that the payment card is a chip card. The indicator that a payment card is a chip card may be based on other information in other embodiments. In some embodiments, EMV/swipe mode instructions 226 may include instructions for associating a swipe mode indicator and indicator that a payment card is a chip card with electronic payment information received at the payment terminal during the swipe mode. EMV/swipe mode instructions 226 may generate and associate other indicators in other embodiments.

In some embodiments, EMV/swipe mode instructions 226 may include instructions for processing a payment transaction with electronic payment information of a swipe payment type provided by a payment card that is not a chip card. In this regard, EMV/swipe mode instructions 226 may cause the merchant device 29 to receive a payment transaction request and electronic payment information of a swipe payment type from swipe interface 105 of payment reader 22. EMV/swipe mode instructions 226 may cause merchant device 29 to determine the card that provided the electronic payment information is not a chip card and process the electronic payment information provided by the card according to a swipe protocol. In some embodiments, the swipe protocol may include steps for processing electronic swipe payment information using conventional methods (e.g., if a swipe only card is provided to the payment reader 105, the liability shift to the merchant may not occur).

In some embodiments, EMV/swipe mode instructions 226 may include instructions for permitting normal processing of a payment transaction after a request to enter swipe mode has been accepted (e.g., from one payment transaction to another). For example, the merchant device 29 may determine that conditions that prompted the request to enter swipe mode have abated or no longer exist. In some embodiments, the determination may be based on a determination that a number of customers present on the merchant's premises has fallen below a threshold, or that a time between payment transactions now exceeds the threshold time it previously fell below. In this regard, merchant device 29 may exit swipe mode and resume operations for normal processing of payment transactions. In some embodiments, EMV/swipe mode instructions 226 may include instructions for processing payment information from a chip card at contact interface 104 using normal payment processing after entering swipe mode. A request for normal chip card processing may be provided from user interface 210, and EMV/swipe mode instructions 226 may include instructions for processing electronic payment information from the chip card in the normal manner (e.g., through communication with the chip card at contact interface 104). For example, EMV/swipe mode instructions 226 may cause merchant device 29 to receive the payment information and transmit the electronic payment information to one or more payment servers. EMV/swipe mode instructions 226 may receive a payment approval response at a communication interface of payment terminal 20 (e.g., wireless interface 214) in response. In this regard, no liability shift may occur as part of processing electronic payment information from the chip card (e.g., liability for the payment transaction request is not assigned to the merchant).

EMV/swipe mode instructions 226 may include instructions for transmitting electronic payment information associated with a payment transaction request to one or more payment servers, such as via wireless interface 214. The electronic payment information may be received at the merchant device 29 via executing normal processing or swipe mode, and may include one or more of a swipe mode indicator and indicator that a card that provided the electronic payment information is a chip card. EMV/swipe mode instructions 226 may include instructions for receiving a payment approval response associated with electronic payment information transmitted to the one or more payment servers. Thus, for a plurality of electronic payment information transmissions, in an exemplary embodiment, a payment approval response associated with the electronic payment information may be received at a communication interface of the payment terminal 20 (e.g., at wireless interface 214). Note that, in some embodiments, a payment approval response may be based on one or more of the swipe mode indicator and indicator that a card that provided the electronic payment information is a chip card. The payment approval response may be based on other information in other embodiments.

In some embodiments, EMV/swipe mode instructions 226 may include instructions for identifying a delay condition during which transmission of electronic payment information to one or more payment servers should be delayed. The condition may be an event such as a loss of connectivity with the one or more payment servers, a high transaction volume, slow connection speeds, or any combination thereof. In some embodiments, EMV/swipe mode instructions 226 may include instructions for storing the electronic payment information (e.g., in memory 204) in response to identification of the delay condition. In some embodiments, EMV/swipe mode instructions 226 may cause merchant device 29 to monitor the delay condition and, upon expiration of the delay condition, transmit the electronic payment information stored in response to the delay condition to the one or more payment servers. In some embodiments, the delay condition may be a determination that a frequency of payment transactions (e.g., at payment terminal 20) exceeds a threshold frequency. In an embodiment, the delay condition may comprise a connection speed between the payment terminal 20 (e.g., merchant device 29) and one or more payment servers. In some embodiments, a threshold may be based on any suitable information, including merchant identification, merchant type, merchant location, employee identification, customer identification, item type, time, or other information. In some embodiments, expiration of the delay condition may comprise the frequency of payment transactions falling below the threshold. In one embodiment, expiration of the delay condition may comprise a connection speed exceeding a threshold connection speed. In other embodiments, expiration of the delay condition may be based on any suitable information.

Note that, in some embodiments, capabilities assigned to merchant device 29 based on EMV offline instructions 224 and EMV/swipe mode instructions 226 may be combined. For example, if a determination that a duration for processing a payment transaction using expedited processing mode based on EMV offline instructions 224 exceeds a threshold, merchant device 29 may execute EMV/swipe mode instructions 226 in an attempt to reduce payment transaction time. The determination may be based on any suitable information about a transaction and average durations of payment transactions carried out using one or more of expedited processing mode according to EMV offline instructions 224 and swipe mode according to EMV/swipe instructions 226. It will be understood that such capabilities may be combined in any suitable arrangement to achieve the purposes set forth herein.

Figure 5:
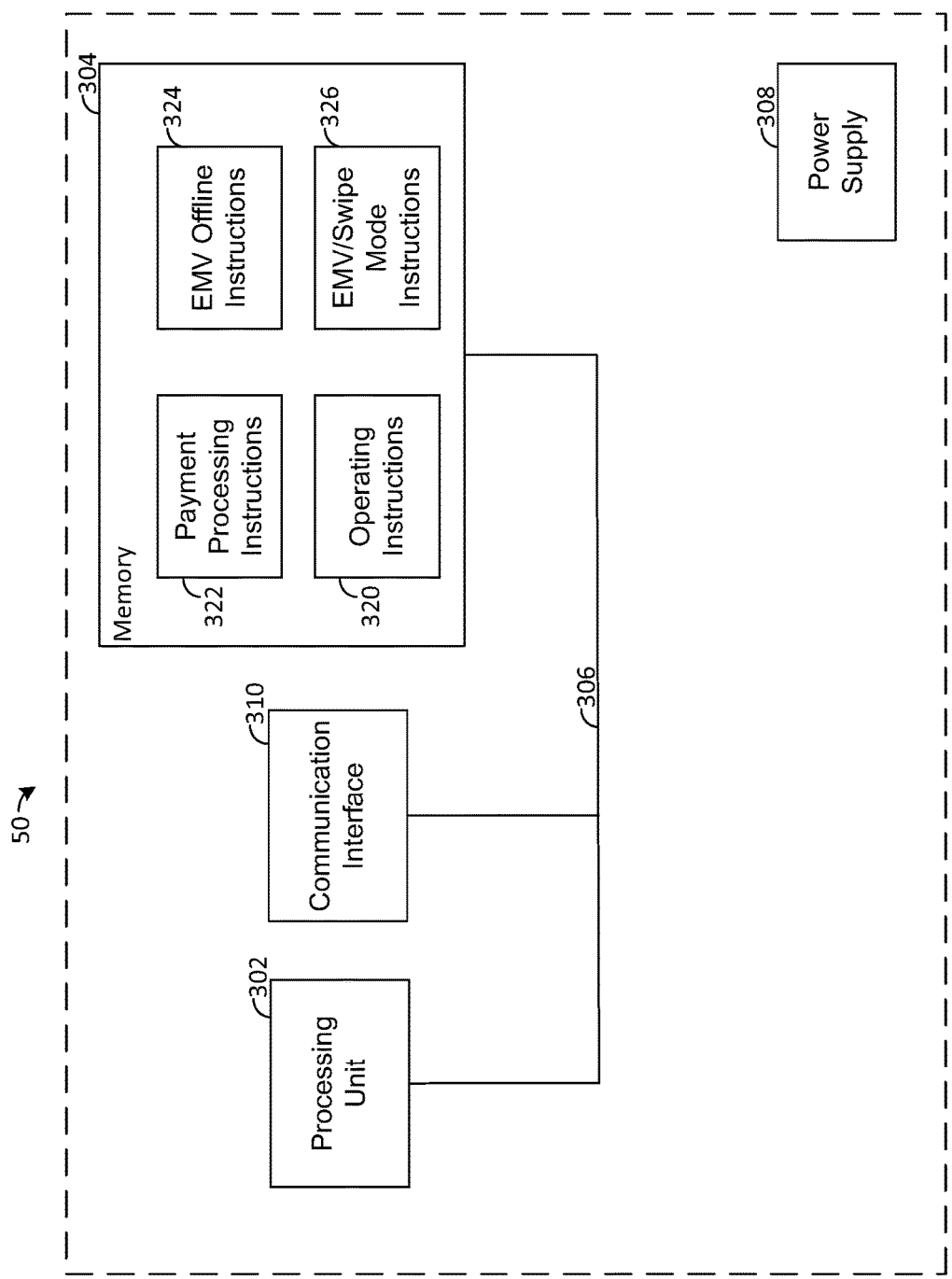
FIG. 5 depicts an illustrative block diagram of a payment service system in accordance with some embodiments of the present disclosure.

FIG. 5 depicts an exemplary payment service system 50 of a payment server 40 in accordance with some embodiments of the present disclosure. Although the payment service system 50 is depicted as a single server, it will be understood that the operations and memory of the payment service system 50 may be distributed over any suitable number of servers. Although particular components are depicted in a particular arrangement in FIG. 5, it will be understood that the payment service system 50 may include additional components, one or more of the components depicted in FIG. 5 may not be included in the payment service system 50, and the components of payment service system 50 may be rearranged in any suitable manner. It will also be understood that, in some embodiments, payment service system 50 may include the necessary components and have the necessary configuration to perform any of the functionality attributed to the payment server 40 herein. In one embodiment, payment service system 50 includes at least a processing unit 302, a memory 304, an interface bus 306, a power supply 308, and a communication interface 310.

In one embodiment, the payment service system 50 includes a processing unit 302 and memory 304 that are configured to control and perform the necessary operations of the payment service system 50. In one embodiment, the processing unit 302 of may be a high-speed processor running instructions for an operating system for the server, programs, and applications based on instructions that may be stored in memory 304. The memory 304 may include any suitable memory types or combination thereof as described herein for storing instructions and other data and providing a working memory for the execution of the operating system, programs, and applications of the payment service system 50. In one embodiment, the memory may include a plurality of sets of instructions, including but not limited to operating instructions 320, payment processing instructions 322, EMV offline instructions 324, and EMV/swipe mode instructions 326.

The processing unit 302 may execute the instructions of memory 304 to interact with and control one or more other components of the payment service system 50. Although the processing unit 302 may communicate with other components of the payment service system 50 in any suitable manner, in one embodiment the processing unit 302 may utilize an interface bus 306. Interface bus 306 may include one or more communication buses such as I2C, SPI, USB, UART, and GPIO. In one embodiment, the processing unit 302 may execute instructions of the memory 304 and based on those instructions may communicate with the other components of the payment service system 50 via the communication buses of interface bus 306.

The payment service system 50 may also include a power supply 308. Power supply 308 may include power conversion circuitry for converting AC power and/or generating a plurality of DC voltages for use by components of the payment service system 50. In some embodiments, power supply 308 may include a backup system such as a battery backup, to avoid interruptions in service during power outages. Although not depicted as physically connected to the other components of the payment service system 50 in FIG. 5, power supply 308 may supply a variety of voltages to the components of the payment service system 50 in accordance with the requirements of those components.

The payment service system 50 may also include a communication interface 310. Although communication interface 310 may include any suitable communication interface or combination thereof, in some embodiments, the communication interface 310 may utilize higher speed communication interfaces such as WiFi, cellular, Ethernet, or fiber optics. The communication interface 310 may establish a secured connection (e.g., via TLS or SSL) with a payment terminal 20 (e.g., payment reader 22 via merchant device 29) in order to exchange messages relating to transactions to be processed, firmware updates, application updates, etc. The communication interface 310 may also communicate with other servers of the payment server 40 such as payment servers, which may, in some embodiments, be located remotely from the payment service system 50 and operated by different entities than those that control the payment service system 50. For example, in one embodiment, the payment service system 50 may be operated by an entity that provides one or more of the payment reader 22, merchant device 29, or point-of-sale application 222. Payment servers may be associated with and operated by one or more of the merchant, issuer, or customer banks.

Memory 304 may include a plurality of sets of instructions for performing the processing operations of the payment service system 50, such as operating instructions 320, payment instructions 322, EMV offline instructions 324, EMV/Swipe mode instructions 326, and any other suitable instructions for operating the payment service system 50 (e.g., instructions related to the operation of one or more other applications or components of the payment service system 50).

Operating instructions 320 may include instructions for controlling any suitable general operations of the payment service system 50, such as internal communications, power management, control of communication devices, control of other hardware of the payment service system 50, any other suitable instructions, or any combination thereof. In one embodiment, the operating instructions may provide instructions for the operating system of the payment service system 50 as well as most drivers, programs, and applications operating on the payment service system 50.

Operating instructions 320 may also include instructions for interacting with a merchant device 29. In one embodiment, the payment service system 50 may communicate with the merchant device 29 via the communication interface 310. Operating instructions 320 may include instructions that when executed by processing unit 302 control these communications and provide for secure communication by implementing procedures such as TLS, SSL or as encrypted data based on keys.

Payment processing instructions 322 include instructions for processing payments, and may control the content of messages that are communicated to the merchant device 29, payment reader 22 (e.g., via merchant device 29), and/or payment servers. In one embodiment, the payment processing instructions may include information about each payment reader 22 and merchant device 29 having an installed point-of-sale application 222. In addition to performing payment processing functions such as providing payment information such as amount and a credit card number to a transaction processing system and communicating responses back to the merchant, the payment service system 50 may also perform complex analysis of merchant data that may be used to provide reports, metrics, or other data to a merchant (e.g., a merchant operating a plurality of merchant devices 29 at a plurality of locations). Payment processing instructions 322 may also include instructions for accessing encryption keys such as a shared private key or a key of a public/private key pair for encrypting and decrypting data provided by one or more of a payment device 10, payment reader 22, or merchant device 29.

EMV offline instructions 324 may include instructions for processing an EMV offline payment approval request received from a payment terminal 20. The EMV offline instructions 324 may include instructions for determining a time to carry out steps to process a payment approval request. In some embodiments, EMV offline instructions 324 may cause payment service system 50 to determine a time corresponding to a time indicated by a time indicator associated with a payment approval request and wait until the time to begin processing the payment approval request. In some embodiments, EMV offline instructions 324 may include instructions for matching a time indicator of a payment approval request with a time indicated by an electronic payment response, such as an ARQC or cryptographic hash. In some embodiments, the EMV offline instructions 324 may include instructions for processing the payment approval request at a time assigned arbitrarily if no time indicator is specified by an ARQC or cryptographic hash of the electronic payment response. In some embodiments, EMV offline instructions 324 may cause the payment service system 50 to provide payment information included in an electronic payment response to a bank server for authorization immediately when the payment service system 50 receives a payment approval request, or may wait until a time corresponding to a time indicator associated with the payment approval request or its associated electronic payment response. In addition, EMV offline instructions 324 may include instructions for assigning an indicator to a payment approval request indicating the occurrence of a liability shift as part of the payment transaction. EMV offline instructions 324 may assign other information to a payment approval request in other embodiments.

In some embodiments, EMV offline instructions 324 may include instructions for storing one or more payment approval requests in memory 304 of the payment service system 50 until a time for transmission for processing at a bank server. The payment approval requests may be transmitted to one or more bank servers at various times, such as when received at a communication interface 310 of the payment service system 50, at a time corresponding to a time associated with a time indicator of the payment approval request, when a number of payment approval requests received at the payment service system 50 exceeds a threshold, or other time. In some embodiments, a time for transmission of a payment approval request may be determined according to a user input or any other suitable information.

In some embodiments, EMV offline instructions 324 may cause payment service system 50 to receive a payment approval response (e.g., from a bank server) and provide the response to the payment terminal 20. The payment approval response may indicate whether an issuer has approved or declined a payment transaction based on a corresponding payment approval request. In some embodiments, the payment approval response may be based on a payment-type indicator associated with a payment approval request (e.g., the payment approval response may be provided without a requirement of additional round-trip communications with the chip card). In this regard, a payment approval response may indicate a basis for the outcome of the payment approval response (e.g., why a bank server approved or declined an associated payment approval request).

EMV/swipe mode instructions 326 may include instructions for processing electronic payment information received from payment terminal 20. In some embodiments, EMV/swipe mode instructions 326 may include instructions for determining that the electronic payment information has been provided together with an accompanying swipe mode indicator and indicator that the card that provided the electronic payment information is a chip card. EMV/swipe mode instructions 326 may cause payment service system 50 to determine, based on the payment information and indicators, that the payment transaction has been completed as a swipe mode transaction. In some embodiments, EMV/swipe mode instructions 326 may cause payment service system 50 to modify or assign an indicator to the electronic payment information and transmit the electronic payment information to one or more servers (such as a bank server) for approval. In some embodiments, EMV/swipe mode instructions 326 may include instructions for receiving a plurality of electronic payment information from payment terminal 20 and storing the plurality of electronic payment information for transmission to the one or more servers. EMV/swipe mode instructions 326 further may include instructions for transmitting the plurality of electronic payment information to one or more servers for approval.

In some embodiments, EMV/swipe mode instructions 326 may include instructions for receiving a payment approval response for the electronic payment information and transmit the payment approval response to the payment terminal 20. In some embodiments, the payment approval response may indicate whether a payment transaction is accepted or declined by the card issuer. In some embodiments, the payment approval response may be based on one or more of the swipe mode indicator and indicator that the card that provided the electronic payment information is a chip card. In some embodiments, the indicators may comprise information indicating to the one or more payment servers that chip card provided electronic payment information of a swipe payment type. In this regard, the indicator may allow the one or more servers to determine that no technical fallback occurred and that the merchant has accepted an opt-in request, shifting liability for the payment request to the merchant. In some embodiments, the indicators may indicate that the payment card that provided the electronic swipe payment information was not from a chip card, and that liability for the payment request may remain with the bank or issuer. EMV/swipe mode instructions 326 may include instructions for receiving the payment approval response and transmitting it to payment terminal 20. In some embodiments, payment service system may repeat the process for each of the plurality of electronic payment information received at the payment service system 50 based on EMV/swipe mode instructions 326.

Figure 6:
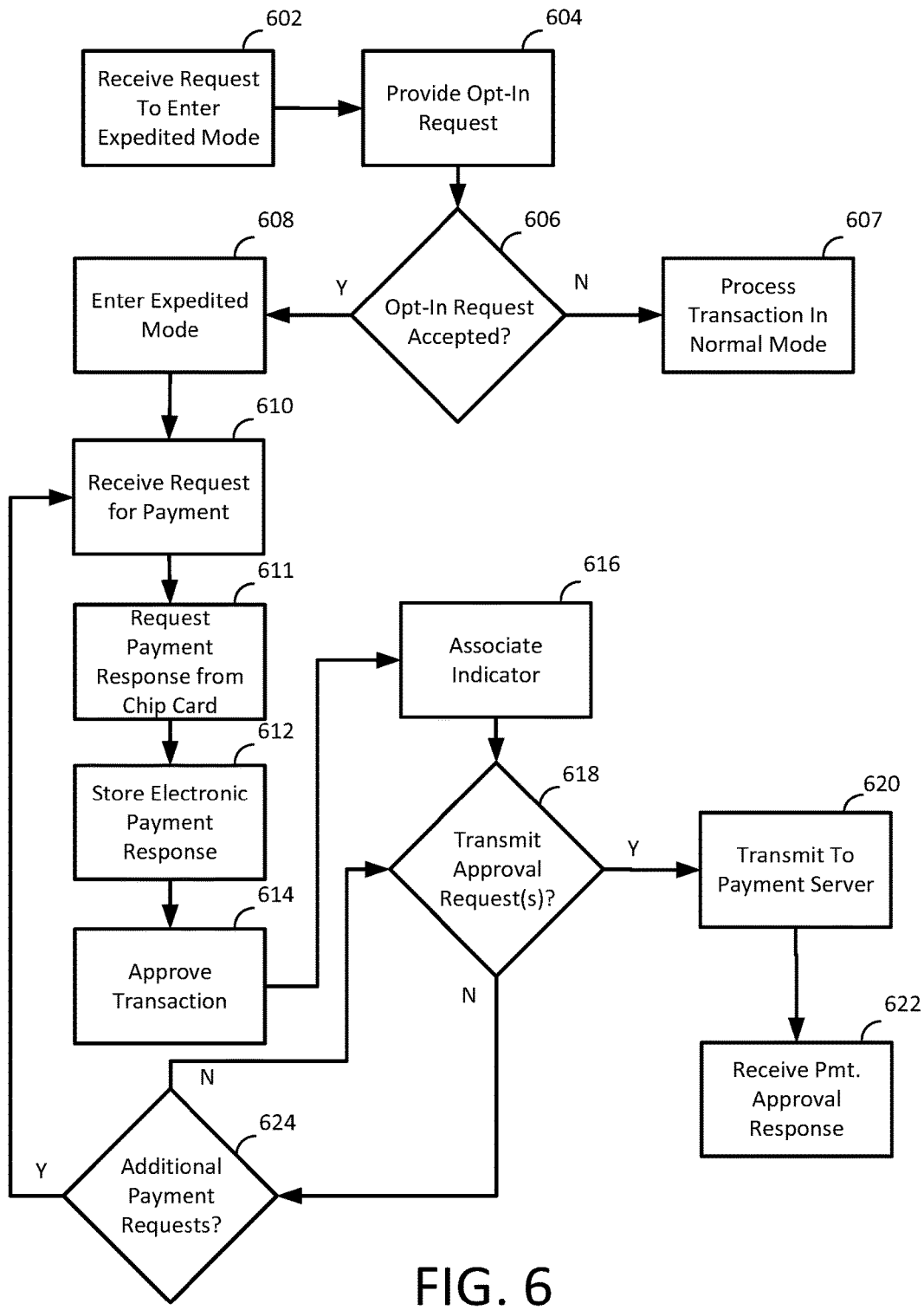
FIG. 6 depicts a non-limiting flow diagram illustrating exemplary methods for processing electronic payment information received from a chip card in an expedited processing mode in accordance with some embodiments of the present disclosure.
Figure 7:
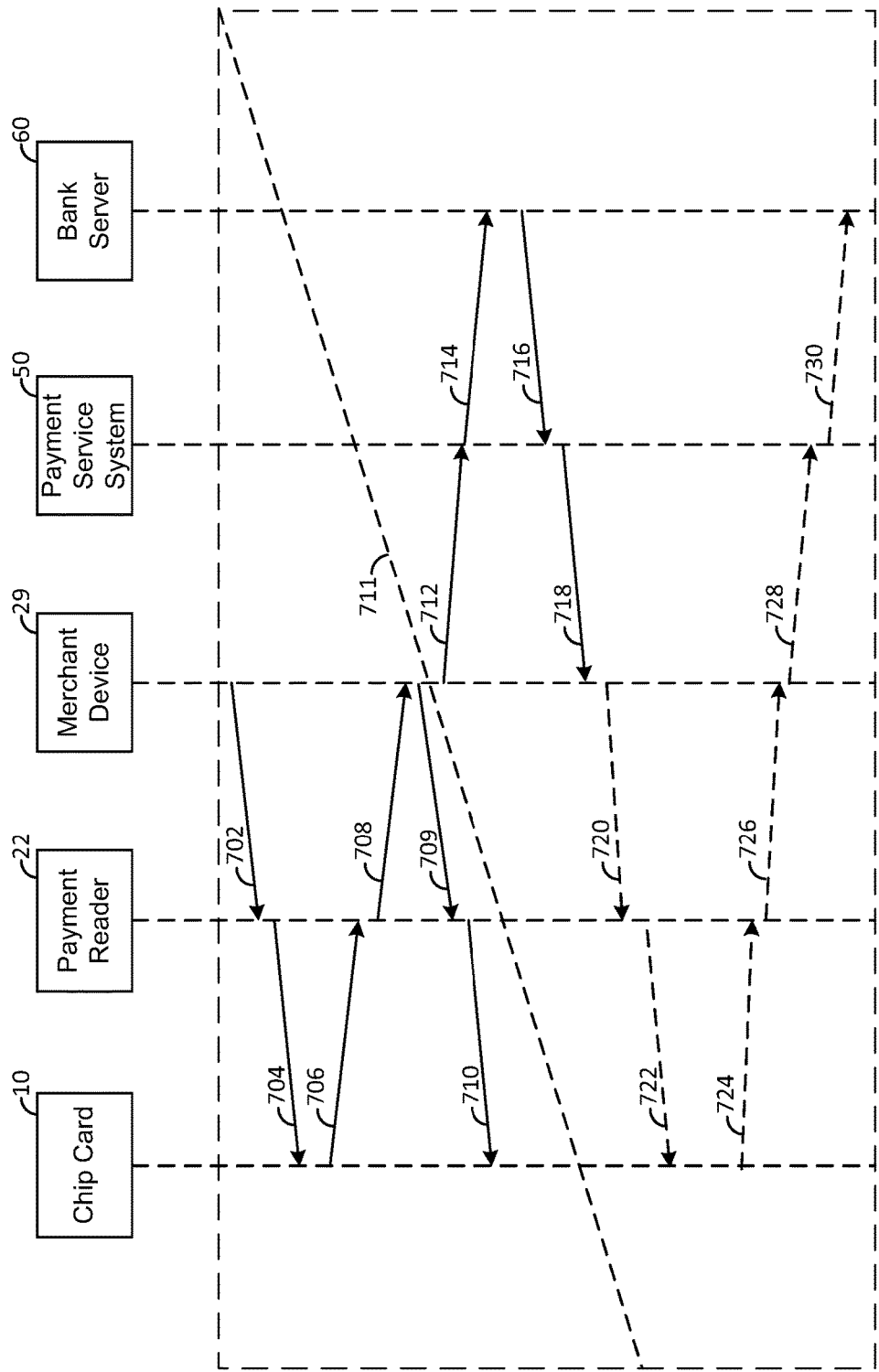
FIG. 7 depicts a non-limiting ladder diagram illustrating exemplary methods for processing electronic payment information received from a chip card in an expedited processing mode in accordance with some embodiments of the present disclosure.
Figure 8:
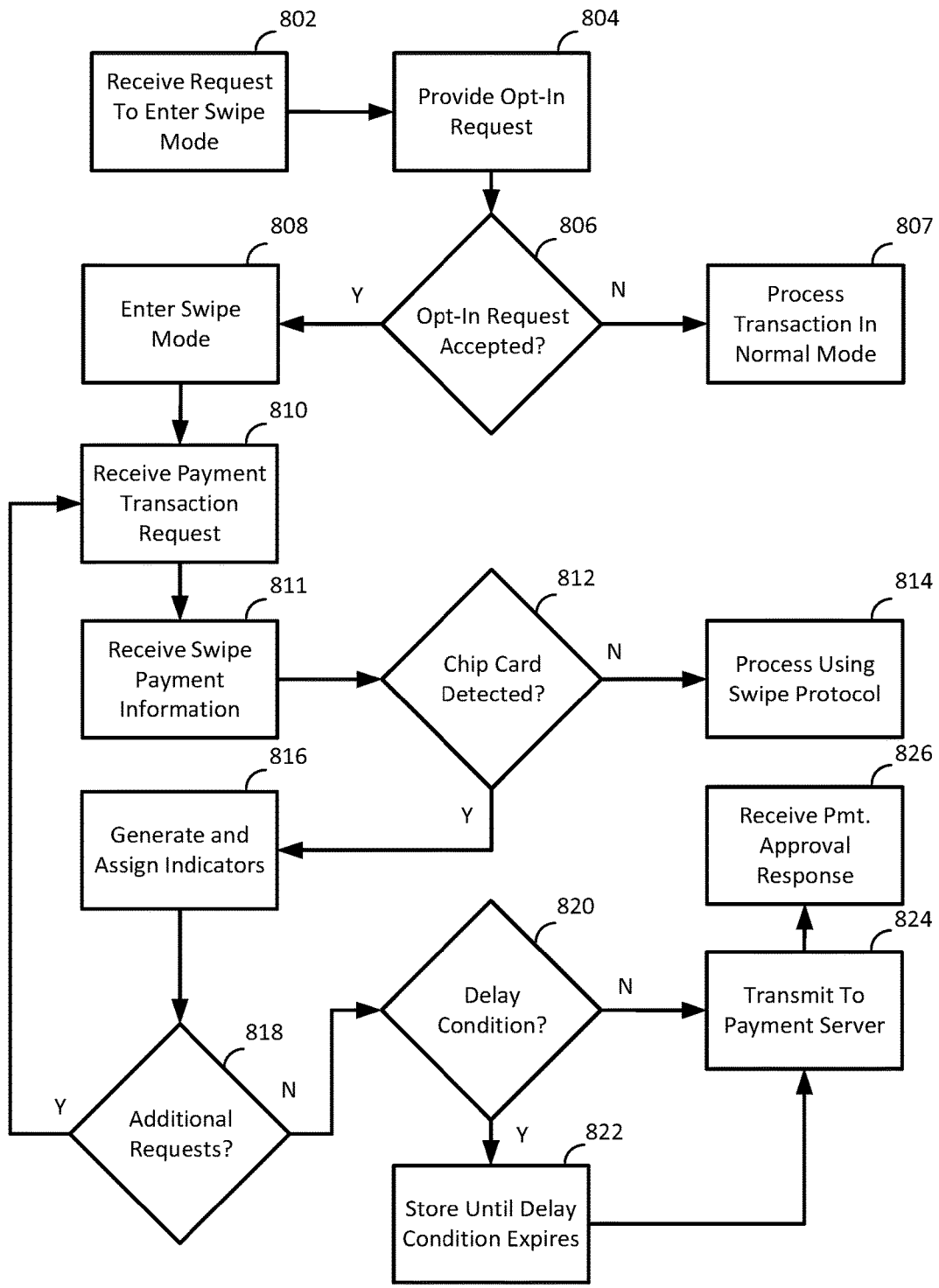
FIG. 8 depicts a non-limiting flow diagram illustrating exemplary methods for selectively processing electronic payment information through a plurality of interfaces in accordance with some embodiments of the present disclosure.

In view of the structures and devices described supra, methods that can be implemented in accordance with the disclosed subject matter will be better appreciated with reference to the flowcharts of FIGS. 6-8. While, for purposes of simplicity of explanation, the methods are shown and described as a series of steps, it is to be understood and appreciated that such illustrations or corresponding descriptions are not limited by the order of the steps, as some steps may occur in different orders and/or concurrently with other steps from what is depicted and described herein. Any non-sequential, or branched, flow illustrated via a flowchart should be understood to indicate that various other branches, flow paths, and orders of the steps, can be implemented which achieve the same or a similar result. Moreover, not all illustrated steps may be required to implement the methods described hereinafter.

FIG. 6 depicts exemplary methods for expedited processing of electronic payment transactions in accordance with some embodiments of the present disclosure. In one embodiment, as is depicted in FIG. 6, methods for expedited processing of electronic payment transactions may be performed by a payment terminal 20 device (e.g., as described in the exemplary embodiment of FIG. 6, the combination of payment reader 22 and merchant device 29). Although these steps are described as being performed by particular devices in one embodiment, it will be understood that the allocation of the steps between the devices may be modified in any suitable manner or that the number of devices performing the steps may be modified in any suitable manner.

At step 602, a request to enter expedited processing mode may be received at a user interface 210 of merchant device 29 for processing payment transactions at the merchant device 29 and payment reader 22 according to the steps of an expedited processing mode. In some embodiments, the request may be received as an input from a user via point-of-sale application instructions 222 displayed at user interface 210. In some embodiments, the request may be generated in response to a message displayed to the user via the user interface 210 when a payment transaction begins (e.g., when the user opens point-of-sale application instructions 222, a payment device 10 is detected, a customer provides an input at the payment reader 22, or any combination thereof). In some embodiments, the request may be generated automatically in response to a determination that merchant device 29 is unable to communicate with one or more payment servers, or based on other criteria such as transaction frequency or queue size. After the request to enter expedited processing mode has been received, processing may continue to step 604.

At step 604, an opt-in request may be provided at user interface 210 of merchant device 29 in response to the request to enter expedited processing mode received at step 602. In some embodiments, the opt-in request may be displayed at user interface 210 to a user as a graphical message, and may include GUI elements that the user may select to provide input indicating whether the user accepts the opt-in request. In some embodiments, the opt-in request may include disclosures or notifications regarding the ramifications of accepting or declining the opt-in request, such as information indicating that a liability shift to the merchant will be required for certain transactions (e.g., chip card transactions) if the merchant enters the expedited processing mode. After the opt-in request has been provided to the user interface 210, processing may continue to step 606.

At step 606, the merchant device 29 may determine whether the opt-in request has been accepted. The determination may be made based on the input from step 604. Note that, in some embodiments, the user only may be permitted to execute the steps of the expedited processing mode when user accepts the opt-in request. In some embodiments, if a user declines the opt-in request, processing may continue to step 607, where processing of the payment transaction at the merchant device 29 and payment reader 22 may continue according to the steps of a normal transaction processing mode (e.g., according to normal chip card processing procedures). If the user accepts the opt-in request, processing may proceed to step 608.

At step 608, the merchant device 29 may enter an expedited processing mode and perform the remaining steps depicted by FIG. 6. At step 610, a first request for payment information may be received at a user interface 210 of merchant device 29. The request for payment may be provided as an input from a merchant via point-of-sale application 222 based on progress of the merchant and customer in conducting a transaction. The customer may then be prompted to insert the chip card into the payment reader 22, e.g., by a user interface or instructions provided by the merchant. After the request for payment information has been received, processing may continue to step 611.

At step 611, merchant device 29 may provide an electronic request to payment reader 22 for an electronic payment response from the inserted chip card. The chip card may perform risk management in response to the request for electronic payment response and either approve the transaction offline (e.g., based on offline payment limits stored at the chip card, in which case it will not be required to process the transaction with a liability shift), or if offline approval is not approval is not available, provide an electronic payment response including information required for an online authorization request according to an expedited payment protocol. In some embodiments, the payment response may include an authorization request cryptogram or other similar information required to perform online authorization of an electronic payment request. After the request for an electronic payment response has been provided to the chip card and the chip card has provided an associated electronic payment response, processing may continue to step 612.

At step 612, merchant device 29 may store the electronic payment response received from the chip card in memory at the merchant device 29 (e.g., memory 204 of merchant device 29). In some embodiments, a plurality of electronic payment responses associated with a plurality of requests for an electronic payment response may be stored at any given time. For example, following receipt at the merchant device 29 of a first electronic payment response associated with a first request, the merchant device 29 may request additional electronic payment responses and additional responses associated with the additional requests may be received and stored at the merchant device 29. In this regard, the plurality of electronic payment responses may be received and stored as a batch, piecemeal, one-at-a-time, or any combination thereof. After the electronic payment response has been stored in memory at the merchant device 29, processing may continue to step 614.

At step 614, merchant device 29 may provide approval of the payment transaction for which the electronic payment response was provided. The approval may be based on standard EMV processing steps at the merchant device 29, such as EMV processing carried out during normal operations at the merchant device 29. In an embodiment as depicted in FIG. 6, the merchant device 29 may provide the approval as an offline approval without communicating the electronic payment response to a payment server. In some embodiments, the merchant device 29 may provide a notification for a user (e.g., to the user interface) following the approval prompting removal of the chip card from the chip card interface 104. The user may remove the chip card before transmission of any information associated with the transaction occurs, such as the electronic payment response or other information. After approval for the transaction has been provided, processing may continue to step 616.

In other embodiments, not depicted in FIG. 6, the merchant device may monitor parameters such as connection speed with a payment server, an average response time for the payment server, an elapsed time for the present transaction, a transaction amount, and an anticipated time for completion of the transaction to determine whether to provide offline approval or to communicate with the payment server to obtain approval (e.g., utilizing a standard payment protocol or an expedited payment protocol). In some embodiments, transactions that are not approved offline may be processed in a manner such that a liability shift to the merchant is not required, e.g., such that the transaction is not approved until a response is received from the payment server. However, the conditions may be calibrated such that these online transactions are required in situations where the delay is unlikely to delay transactions or cause merchant and customer discomfort. Accordingly, under the proper conditions, only some of the transactions may be processed with a liability shift.

Returning to the steps of FIG. 6, at step 616, merchant device 29 may associate one or more indicators with each electronic payment response received in response to a request for electronic payment response. In some embodiments, the one or more indicators may include a payment-type indicator. The payment-type indicator may indicate to one or more payment servers that one or more electronic payment responses is to be processed according to an expedited payment protocol. According to the expedited payment protocol, the transaction may be approved or denied by payment servers without the need for any additional communications with the chip card. This may allow the chip card to be removed at an earlier stage of the transaction, and for electronic payment responses to be stored by the payment reader or merchant device for later transmission to the payment server.

In some embodiments, the one or more indicators may include a time indicator associated with a payment approval request. In some embodiments, a time indicator may be associated with each payment approval request, and may correspond to a future transaction time. After the one or more indicators have been associated with each electronic payment response, processing may continue to step 618.

At step 618, merchant device 29 may determine whether to transmit a payment approval request to one or more payment servers. In some embodiments, the determination may be based on a check that merchant device 29 may perform to determine whether a communication interface merchant device 29 (e.g., wireless interface 214) is able to communicate with the one or more payment servers, or based on other parameters such as a connection speed or average transaction processing time. If the communication interface 214 is unable to communicate with the one or more payment servers or if an expected transaction time exceeds a threshold, merchant device 29 may determine that the payment approval request should not be transmitted yet, and processing may continue to step 624. If the communication interface 214 is able to communicate with the one or more payment servers, merchant device 29 may determine that it may transmit the payment approval requests, and processing may continue to step 620.

At step 620, merchant device 29 may transmit one or more payment approval requests and its associated one or more indicators to one or more payment servers. In some embodiments, merchant device 29 may determine when it may transmit a payment approval request based on its associated time indicator. In some embodiments, a first payment approval request may be transmitted prior to receipt of additional electronic payment responses at the merchant device 29. In some embodiments, each payment approval request may be transmitted at a time that corresponds to the time of its associated time indicator. In some embodiments, merchant device 29 may transmit a payment approval request and indicators prior to the time of the time indicator when a time indicator corresponds to a future time. In this regard, the time indicator may indicate that the one or more payment servers should wait to process the payment approval request until the time corresponding to the time of the time indicator. In such an embodiment, a payment service system may forward the requests to a bank or issuer server of the payment servers for approval at the time of the time indicator. After merchant device 29 has transmitted one or more payment approval requests, processing may continue to step 622.

At step 622, merchant device 29 may receive one or more payment approval responses from the one or more payment servers in response to transmitting the one or more payment approval requests. In some embodiments, merchant device 29 may receive each payment approval response via a communication interface (e.g., wireless interface 214). In some embodiments, each payment approval response may be associated with each payment approval request transmitted from merchant device 29. The merchant device may then process the received payment approval response, e.g., by storing records of approvals and denials and providing notifications (e.g., of transaction denials following a liability shift).

As discussed above, if the merchant device 29 is unable to transmit the approval request, processing may continue to step 624. At step 624, merchant device 29 may determine whether additional requests for payment have been received, such as at the user interface 210 of merchant device 29. A user may conduct subsequent payment transactions, each associated with a unique request for payment. If additional requests for payment have been received, processing may return to step 610 and steps 610 through 618 may be repeated. If no additional requests for payment have been received, processing may return to step 618 to determine whether the approval requests may be transmitted. Processing may continue to pass between these two states (e.g., at regular intervals) until additional payments are requested or the existing transactions are transmitted to the payment servers for approval.

FIG. 7 depicts a non-limiting ladder diagram illustrating exemplary steps for expedited processing of electronic payment transactions in accordance with some embodiments of the present disclosure. In one embodiment, as is depicted in FIG. 7, methods for expedited processing of electronic payment transactions may be performed by a payment terminal 20 device (e.g., the combination of payment reader 22 and merchant device 29), a payment service system 50, and bank server 60. Although these steps are described as being performed by particular devices in one embodiment, it will be understood that the allocation of the steps between the devices may be modified in any suitable manner or that the number of devices performing the steps may be modified in any suitable manner.

At step 702, merchant device 29 provides a request for a first electronic payment response from a chip card 10 in response to a request for payment. As described herein, the request for payment may be provided via user interface 210 or merchant device 29, and the chip card 10 may be inserted into contact interface 104 of payment reader 22. The request for payment may include a payment amount or other suitable information. After payment reader 22 receives the request for payment, processing may continue to step 704.

At step 704, payment reader 22 may request the electronic payment response from the chip card 10, and at step 706, the chip card provides the electronic payment response. As described herein, the electronic payment response may indicate that the chip card 10 has declined to provide approval for the transaction. In some embodiments, the chip card 10 may approve the transaction and provide electronic payment information (e.g., an ARQC). At step 708, payment reader 22 may forward the electronic payment information to merchant device 29. After payment reader 22 forwards the electronic payment response from the chip card 10 to merchant device 29, processing may continue to step 709.

At step 709, merchant device 29 may provide to payment reader 22 an approval of the payment transaction for which the electronic payment response was provided. As described herein, the approval may be based on standard EMV processing steps at the merchant device 29 or as an offline approval without communicating the electronic payment response to a payment server. At step 710, payment reader 22 may provide the approval for the transaction to the chip card 10 indicating approval of the transaction to the chip card. Merchant device may provide a notification to a user that the chip card 10 may be removed, as described above.

Exemplary steps executed by the merchant device 29 and payment reader 22 as part of an expedited processing mode may be identified with reference to line 711. Steps comprising the expedited processing mode in an exemplary embodiment may be performed by the merchant device 29 and payment reader 22, without communicating with the payment service system 50 or bank server 60, as is depicted to the left of line 711 in FIG. 7. Steps that may occur at a later time to complete approval of the expedited processing of the transaction are depicted as solid lines to the right of line 711 (e.g., steps 712, 714, 716, and 718). Steps that are performed in a normal operating mode, in which communication with the payment card continues after communications with the payment service system 50 and bank server 60, are depicted to the right of line 711 and are depicted with dashed lines (e.g., steps 720, 722, 724, 726, 728, and 730). These steps are skipped in the expedited processing mode, such that the chip card may be removed after step 710.

At step 712, merchant device 29 may provide one or more payment approval requests to the payment service system 50. As described herein above, each payment approval request may comprise one or more electronic payment responses and an associated payment-type indicator for each. In some embodiments, multiple payment approval requests may be sent in batches, e.g., when payment processing frequency falls below a threshold or a connection speed exceeds a threshold. In some embodiments, each payment approval request may also comprise a time indicator that may correspond to a transaction time (e.g., future time), and may indicate a time for transmission, as described above. At step 714, payment service system 50 may forward each of the one or more payment approval requests it receives to bank server 60 for approval. As noted herein, each of the one or more payment approval requests may be transmitted at a time that corresponds to the time of the time indicator. In some embodiments, the payment service system 50 may wait until the time of the time indicator to transmit a payment approval request.

At step 716, payment service system 50 may receive, at a communication interface of the payment service system 50, one or more payment approval responses provided by bank server 60. Note that, in some embodiments, each payment approval response may correspond to one of the one or more payment approval requests provided to the bank server 60 for approval at step 714. After payment service system 50 receives a payment approval response from the bank server 60, processing may continue to step 718.

At step 718, payment service system 50 may provide one or more payment approval responses received at step 716 to the merchant device 29. As described herein, each approval response may correspond to a particular payment approval request obtained as part of a payment transaction. In this regard, merchant device 29 may receive confirmation that a particular payment transaction has been approved or declined by each respective bank server 60. After a payment approval response has been received at step 818, processing may continue to step 720.

As noted above, steps 720, 722, 724, 726, 728, and 730 may be performed during a normal operating made in which expedited processing is not taking place. Thus, steps 720 through 730 may not occur in embodiments in which merchant device 29 and payment reader 22 execute the steps of expedited processing mode described herein. However, when the merchant device 29 and payment reader 22 are not operating in expedited processing mode, the merchant device 29 may provide a payment approval response to payment reader 22 at step 720, and the payment reader 22 may forward the payment approval response to the chip card 10 at step 722. When the chip card 10 receives the payment approval response, it may provide a receipt message to payment reader 22 at step 724. In some embodiments, the receipt message may be indicative of a confirmation that the chip card 10 has received the payment approval response. At step 726, payment reader 22 transmits the receipt message received from the chip card 10 to merchant device 29. When a merchant device 29 receives one or more receipt messages from one or more chip cards 10, processing may proceed to step 728.

At step 728, merchant device 29 may transmit one or more receipt messages from a chip card 10 to a payment service system 50. As described herein, the merchant device 29 may transmit a receipt message according to one or more associated indicators, such as a time indicator. The payment service system 50 may transmit the receipt message to a corresponding bank server 60 at step 730. Thereafter, processing may end.

FIG. 8 depicts a non-limiting flow diagram illustrating exemplary steps for selectively processing electronic payment information through a plurality of interfaces in accordance with some embodiments of the present disclosure. Although it will be understood that any suitable device may process the electronic payment information, in an exemplary embodiment, the transaction may be completed by a payment terminal including a merchant device 29 and payment reader 22.

At step 802, a request to process chip card payment transactions using a according to the steps of a swipe mode may be received at a user interface 210 of merchant device 29. In some embodiments, the request may be received as an input from a user via point-of-sale application instructions 222 displayed at user interface 210. In some embodiments, the request may be generated in response to a message displayed to the user via the user interface 210 when a payment transaction begins (e.g., when the user opens point-of-sale application instructions 222, a payment device 10 is detected, a customer provides an input at the payment reader 22, or any combination thereof). In some embodiments, the request may be generated automatically in response to a determination that a chip card has been inserted into payment terminal 20, based on transaction frequency, queue size, or other similar factors. After the request to enter swipe mode has been received, processing may continue to step 804.

At step 804, an opt-in request may be provided at user interface 210 of merchant device 29 in response to the request to enter swipe mode received at step 802. In some embodiments, the opt-in request may be displayed at user interface 210 to a user as a graphical message, and may include indicators the user may select to provide input indicating whether the user accepts the opt-in request. In some embodiments, the opt-in request may include disclosures or notifications regarding the ramifications of accepting or declining the opt-in request (e.g., liability shift from card issuer to merchant), and may include information from a card issuer, a merchant, regulatory authority, or any combination thereof. After the opt-in request has been provided to the user interface 210, processing may continue to step 806.

At step 806, merchant device 29 may determine whether a user has accepted the opt-in request provided at step 804. The determination may be made based on the input from step 804. Note that, in some embodiments, the user only may be permitted to execute the steps of the swipe mode when user accepts the opt-in request. In some embodiments, if a user declines the opt-in request, processing may continue to step 807, where processing of the payment transaction at the payment terminal 20 may continue according to the steps of a normal operational mode (e.g., requiring that a chip card be inserted into the chip card interface of the payment reader 22, except under special circumstances such as a technical fallback situation). If the user accepts the opt-in request, processing may proceed to step 808.

At step 808, the merchant device 29 may enter a swipe processing mode, in which chip cards may be run as magstripe cards without first attempting to operate as a chip card. Processing may continue to step 810, at a first payment transaction request may be received at a user interface 210 of merchant device 29. The request for payment may be provided as an input from a merchant via point-of-sale application 222, and may indicate a request for electronic payment information based progress of a purchase (e.g., progression to a desired point of a payment transaction, finalizing of a payment amount, etc.). After the payment transaction request has been received, processing may continue to step 811.

At step 811, merchant device 29 may receive swipe payment information from payment reader 22. In some embodiments, payment reader 22 may read a magstripe of a payment card swiped through swipe interface 105. After electronic payment information of a swipe payment type in response to the payment transaction request has been received at the merchant device, processing may continue to step 812.

At step 812, merchant device 29 may determine whether a payment card that provided electronic payment information of a swipe payment type is a chip card. In some embodiments, merchant device 29 may determine whether the payment card is a chip card based on the electronic payment information provided at swipe interface 105 of payment reader 22. If merchant device 29 determines that the payment card that provided electronic payment information of a swipe payment type is not a chip card, processing may continue to step 814, and the payment terminal 20 may complete payment processing for the transaction using a normal swipe payment transaction protocol based on the determination. If the merchant device 29 determines that the payment card that provided electronic payment information of a swipe payment type is a chip card, processing may continue to steep 816.

At step 816, merchant device 29 may generate and associate indicators with electronic payment information received during swipe mode. In some embodiments, merchant device 29 may generate a swipe mode processing indicator based on the payment terminal entering swipe mode. The swipe mode processing indicator may permit electronic payment information to be processed according to procedures for processing swipe payment type and indicate that the transaction is not a technical fallback transaction (e.g., the transaction is not a transaction in which the chip card failed to process at a chip card interface of the payment terminal). Because the chip card is being operated in the swipe mode in the absence of technical fallback, the swipe mode processing indicator may inform one or more payment servers that the transaction should be processed as a swipe transaction, requiring a liability shift to the merchant. In some embodiments, merchant device 29 may generate an indicator that a payment card that provided the electronic payment information is a chip card. The indicator that the payment card is a chip card may be based on any suitable information, including a notification received at the merchant device 29 that the payment card is a chip card (e.g., such as following the determination that the payment card is a chip card at step 812). In some embodiments, the swipe mode indicator and indicator that a payment card is a chip card may be associated with electronic payment information received at the payment terminal during the swipe mode. After indicators have been generated and assigned, processing may continue to step 818.

At step 818, merchant device 29 may determine whether additional payment transaction requests have been received, such as via user interface 210. If merchant device 29 determines additional requests have been received, the electronic payment and indicators may be stored for the current transaction may be stored in memory and processing may return to step 810. If no additional payment transaction requests have been received, processing may continue to step 820, where merchant device 29 may identify a delay condition. In some embodiments, delay conditions merchant device 29 may identify may be an event such as a loss of connectivity with the one or more payment servers, a high transaction volume, slow connection speeds, or any combination thereof. In some embodiments, the delay condition may be a determination that a frequency of payment transactions (e.g., at payment terminal 20) exceeds a threshold frequency. In an embodiment, the delay condition may comprise a connection speed between the payment terminal 20 (e.g., merchant device 29) and one or more payment servers. If merchant device 29 identifies a delay condition at step 820, processing may continue to step 822. If a delay condition is not identified processing may continue to step 824.

At step 822, merchant device 29 may store electronic payment information and indicators (e.g., in memory 204) in response to identification of the delay condition. In some embodiments, merchant device 29 may monitor the delay condition and, upon expiration of the delay condition, transmit the electronic payment information and indicators stored in memory to the one or more payment servers. In some embodiments, expiration of the delay condition may comprise the frequency of payment transactions falling below a threshold. In some embodiments, the threshold may be based on any suitable information, including merchant identification, merchant type, merchant location, employee identification, connection speeds, average approval time, customer identification, item type, time, or other information. After merchant device 29 determines that one or more delay conditions have expired, processing may continue to step 824.

At step 824, merchant device 29 may transmit the electronic payment information and associated swipe mode processing indicator to one or more payment servers, such as via wireless interface 214. The transmitted electronic payment information may be received at the merchant device 29 via executing normal processing or swipe mode, and may include one or more of a swipe mode indicator and indicator that a card that provided the electronic payment information is a chip card. After the electronic payment information and associated swipe mode processing indicator have been transmitted to one or more payment servers, processing may continue to step 826.

At step 826, merchant device 29 may receive a payment approval response for the electronic payment information. In some embodiments, merchant device 29 may receive a payment approval response associated with electronic payment information transmitted to the one or more payment servers. Thus, for a plurality of electronic payment information transmissions, in an exemplary embodiment, a payment approval response associated with the electronic payment information may be received at a communication interface of the payment terminal 20 (e.g., at wireless interface 214). Note that, in some embodiments, a payment approval response may be based on one or more of the swipe mode indicator and indicator that a card that provided the electronic payment information is a chip card. The merchant device may then process the received payment approval response, e.g., by storing records of approvals and denials and providing notifications (e.g., of transaction denials following a liability shift). Thereafter, processing may end.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A method for a payment terminal to selectively process electronic payment information through a plurality of payment interfaces, the method comprising:
   receiving, at a user interface of the payment terminal, a first payment transaction request;
   receiving, at a chip card interface of the payment terminal, first electronic payment information of a first electronic payment information type from a chip card in response to the first payment transaction request;
   transmitting, from a communication interface of the payment terminal, the first electronic payment information to one or more payment servers;
   receiving, at the communication interface of the payment terminal, a first payment approval response for the first electronic payment information;
   receiving, at a user interface of the payment terminal, a request to enter a swipe mode;

providing, at the user interface of the payment terminal, an opt-in confirmation in response to the request to enter the swipe mode, wherein the payment terminal is only permitted to enter the swipe mode when the opt-in confirmation is accepted by the user;
receiving, at the user interface of the payment terminal, a second payment transaction request;
receiving, at a swipe interface of the payment terminal, second electronic payment information of a second electronic payment information type from a payment card when the payment card is swiped through the swipe interface in response to the second payment transaction request, the swiped payment card being a chip card;
receiving, at the payment terminal, a notification that the payment card is a chip card;
generating, at the payment terminal, a swipe mode processing indicator based on the payment terminal entering the swipe mode and the notification, wherein the swipe mode processing indicator allows the second electronic payment information to be processed according to procedures for the second electronic payment information type;
transmitting, from the communication interface of the payment terminal, the swipe mode processing indicator and the second electronic payment information to the one or more payment servers; and
receiving, at the communication interface of the payment terminal, a second payment approval response for the second electronic payment information, wherein the payment approval response is based on the swipe mode processing indicator.

2. The method of claim 1, wherein the swipe mode processing indicator indicates that the transaction is not a technical fallback transaction, and wherein the technical fallback transaction indicates that the chip card failed to process at the chip card interface of the payment terminal.

3. The method of claim 1, further comprising:
identifying a delay condition during which the transmission of the second electronic payment information should be delayed;
storing the second electronic payment information at a memory of the payment terminal; and
transmitting the second electronic payment information based on the expiration of the delay condition.

4. The method of claim 3, wherein the delay condition comprises a frequency of payment transactions and the expiration of the delay condition comprises the frequency of payment transactions falling below a threshold.

5. A method for a payment terminal to selectively process electronic payment information through a plurality of payment interfaces, the method comprising:
receiving, at a user interface of the payment terminal, a request to enter a swipe mode;
providing, at the user interface of the payment terminal, an opt-in confirmation in response to the request to enter the swipe mode, wherein the payment terminal is only permitted to enter the swipe mode when the opt-in confirmation is accepted by the user;
receiving, at the user interface of the payment terminal, a payment transaction request;
receiving, at a swipe interface of the payment terminal, electronic payment information of a swipe payment type from a payment card when the payment card is swiped through the swipe interface in response to the payment transaction request, the swiped payment card being a chip card;
generating, at the payment terminal, a swipe mode processing indicator based on the payment terminal entering the swipe mode and an indicator that the payment card is a chip card, wherein the swipe mode processing indicator allows the electronic payment information to be processed according to procedures for the swipe payment type;
transmitting, from a communication interface of the payment terminal, the swipe mode processing indicator and the electronic payment information to one or more payment servers; and
receiving, at the communication interface of the payment terminal, a payment approval response for the electronic payment information, wherein the payment approval response is based on the swipe mode processing indicator.

6. The method of claim 5, wherein the swipe mode processing indicator indicates that the transaction is not a technical fallback transaction, and wherein the technical fallback transaction indicates that the chip card failed to process at a chip card interface of the payment terminal.

7. The method of claim 5, further comprising:
identifying a delay condition during which the transmission of the electronic payment information should be delayed;
storing the electronic payment information at a memory of the payment terminal; and
transmitting the electronic payment information based on an expiration of the delay condition.

8. The method of claim 7, wherein the delay condition comprises a frequency of payment transactions and the expiration of the delay condition comprises the frequency of payment transactions falling below a threshold.

9. The method of claim 7, wherein the delay condition comprises a connection speed between the payment terminal and the one or more payment servers, and wherein the expiration of the delay condition comprises the connection speed exceeding a threshold.

10. The method of claim 5, further comprising receiving, at the payment terminal, a notification that the payment card is a chip card, wherein the indicator that the payment card is a chip card is based on the notification.

11. The method of claim 5, further comprising:
receiving, at the user interface of the payment terminal, a second payment transaction request;
receiving, at the swipe interface of the payment terminal, electronic payment information of a swipe payment type from a second payment card in response to the second payment transaction request;
determining that the second payment card is not a chip card; and
processing the second payment card according to a standard swipe card protocol based on the determination.

12. The method of claim 5, further comprising:
receiving, at the user interface of the payment terminal, a second payment transaction request;
receiving, at a chip card interface of the payment terminal, second electronic payment information of a chip card payment type from a second chip card in response to the second payment transaction request;
transmitting, from the communication interface of the payment terminal, the second electronic payment information to one or more payment servers; and
receiving, at the communication interface of the payment terminal, a payment approval response for the second electronic payment information.

13. The method of claim 12, wherein liability for the first payment transaction request is assigned to a merchant operating the payment terminal, and wherein liability for the second payment transaction request is not assigned to the merchant.

14. A payment terminal for selectively processing electronic payment information through a plurality of payment interfaces, the payment terminal comprising:
   a swipe interface configured to receive electronic payment information of a swipe payment type from a magstripe payment card;
   a chip card interface configured to receive electronic payment information from a chip card;
   a communication interface configured to communicate with one or more payment servers;
   a user interface configured to receive a request to enter a swipe mode, an opt-in confirmation, and a payment transaction request;
   one or more processing elements coupled to the swipe interface, communication interface, and the user interface, wherein the one or more processing elements are configured to execute user interface instructions, swipe mode instructions, and transaction processing instructions; and
   one or more memories configured to store the user interface instructions, swipe mode instructions, and transaction processing instructions,
   wherein the user interface instructions cause the one or more processing elements to receive a request from the user interface to enter a swipe mode, provide an opt-in confirmation to the user interface in response to the request to enter the swipe mode, and receive a payment transaction request from the user interface,
   wherein the swipe mode instructions cause the one or more processing elements to permit the payment terminal to enter the swipe mode only when the opt-in confirmation is accepted by a user and to generate a swipe mode processing indicator based on the payment terminal entering the swipe mode and an indicator that the payment card is a chip card,
   wherein the swipe mode processing indicator allows the electronic payment information to be processed according to procedures for the swipe payment type, and
   wherein the transaction processing instructions cause the one or more processing elements to:
   (a) receive electronic payment information of a swipe payment type from the payment card when the payment card is swiped through the swipe interface in response to the payment transaction request, the swiped payment card being a chip card,
   (b) transmit the swipe mode processing indicator and the electronic payment information to one or more payment servers via the communication interface, and
   (c) receive a payment approval response for the electronic payment information, wherein the payment approval response is based on the swipe mode processing indicator.

15. The payment terminal of claim 14, wherein the swipe mode processing indicator indicates that the transaction is not a technical fallback transaction, and wherein the technical fallback transaction indicates that the chip card failed to process at the chip card interface of the payment terminal.

16. The payment terminal of claim 14, wherein the transaction processing instructions further cause the one or more processing elements to identify a delay condition during which the transmission of the electronic payment information should be delayed, store the electronic payment information at a memory of the payment terminal, and permit the transmission of the electronic payment information based on an expiration of the delay condition.

17. The payment terminal of claim 16, wherein the delay condition comprises a frequency of payment transactions and the expiration of the delay condition comprises the frequency of payment transactions falling below a threshold.

18. The payment terminal of claim 16, wherein the delay condition comprises a connection speed between the payment terminal and the one or more payment servers, and wherein the expiration of the delay condition comprises the connection speed exceeding a threshold.

19. The payment terminal of claim 14, wherein the swipe mode instructions further comprising receiving, at the payment terminal, a notification that the payment card is a chip card, and wherein the indicator that the payment card is a chip card is based on the notification.

20. The payment terminal of claim 14, wherein the user interface instructions further cause the one or more processors to receive, from the user interface, a second payment transaction request and wherein the transaction processing instructions further cause the one or more processors to receive, from the swipe interface, electronic payment information of a swipe payment type from a second payment card in response to the second payment transaction request, determine that the second payment card is not a chip card, and process the second payment card according to a standard swipe card protocol based on the determination.

21. The payment terminal of claim 14, wherein the user interface instructions further cause the one or more processors to receive, at the user interface, a second payment transaction request and wherein the transaction processing instructions further cause the one or more processors to receive from the chip card interface second electronic payment information of a chip card payment type from the chip card in response to the second payment transaction request, transmit the second electronic payment information to one or more payment servers via the communication interface, and receive a payment approval response for the second electronic payment information via the communication interface.

22. The payment terminal of claim 21, wherein liability for the first payment transaction request is assigned to a merchant operating the payment terminal, and wherein liability for the second payment transaction request is not assigned to the merchant.

23. A non-transitory computer-readable storage medium comprising instructions stored therein, which when executed by one or more processors, cause the one or more processors to perform operations comprising:
   receiving a request to enter a swipe mode from a user interface of the payment terminal;
   providing, to the user interface of the payment terminal, an opt-in confirmation in response to the request to enter the swipe mode, wherein the payment terminal is only permitted to enter the swipe mode when the opt-in confirmation is accepted by a user;
   receiving a payment transaction request from the user interface of the payment terminal;
   receiving electronic payment information of a swipe payment type from a payment card via a swipe interface of the payment terminal when the payment card is swiped through the swipe interface in response to the payment transaction request, the swiped payment card being a chip card;
   generating, at a processing element, a swipe mode processing indicator based on the payment terminal entering the swipe mode and an indicator that the payment card is a chip card, wherein the swipe mode processing indicator allows the electronic payment information to be processed according to procedures for the swipe payment type;

providing the swipe mode processing indicator and the electronic payment information for transmission from a communication interface of the payment terminal to one or more payment servers; and receiving a payment approval response for the electronic payment information from the communication interface of the payment terminal, wherein the payment approval response is based on the swipe mode processing indicator.

24. The non-transitory computer-readable storage medium of claim 23, wherein the swipe mode processing indicator indicates that the transaction is not a technical fallback transaction, and wherein the technical fallback transaction indicates that the chip card failed to process at a chip card interface of the payment terminal.

25. The non-transitory computer-readable storage medium of claim 23, wherein the instructions further comprise instructions that cause the one or more processors to perform operations comprising:

identifying a delay condition during which the transmission of the electronic payment information should be delayed;

storing the electronic payment information at a memory of the payment terminal; and permitting the transmission of the electronic payment information based on an expiration of the delay condition.

26. The non-transitory computer-readable storage medium of claim 25, wherein the delay condition comprises a frequency of payment transactions and the expiration of the delay condition comprises the frequency of payment transactions falling below a threshold.

27. The non-transitory computer-readable storage medium of claim 25, wherein the delay condition comprises a connection speed between the payment terminal and the one or more payment servers, and wherein the expiration of the delay condition comprises the connection speed exceeding a threshold.

28. The non-transitory computer-readable storage medium of claim 23, wherein the instructions further comprise instructions that cause the one or more processors to perform operations comprising receiving a notification that the payment card is a chip card, wherein the indicator that the payment card is a chip card is based on the notification.

29. The non-transitory computer-readable storage medium of claim 23, wherein the instructions further comprise instructions that cause the one or more processors to perform operations comprising:

receiving a second payment transaction request from the user interface of the payment terminal;

receiving electronic payment information of a swipe payment type from a second payment card from the swipe interface in response to the second payment transaction request;

determining that the second payment card is not a chip card; and processing the second payment card according to a standard swipe card protocol based on the determination.

30. The non-transitory computer-readable storage medium of claim 23, wherein the instructions further comprise instructions that cause the one or more processors to perform operations comprising:

receiving a second payment transaction request from the user interface of the payment terminal;

receiving second electronic payment information of a chip card payment type from a second chip card via a chip card interface in response to the second payment transaction request;

providing the second electronic payment information for transmission from the communication interface of the payment terminal to one or more payment servers; and receiving a payment approval response for the second electronic payment information from the communication interface of the payment terminal.

31. The non-transitory computer-readable storage medium of claim 30, wherein liability for the first payment transaction request is assigned to a merchant operating the payment terminal, and wherein liability for the second payment transaction request is not assigned to the merchant.

* * * * *